(12) United States Patent
Bunea et al.

(10) Patent No.: US 11,404,997 B2
(45) Date of Patent: Aug. 2, 2022

(54) PHOTOVOLTAIC SHINGLES AND METHODS OF INSTALLING SAME

(71) Applicant: GAF Energy LLC, Parsippany, NJ (US)

(72) Inventors: Gabriela Bunea, San Jose, CA (US); Thierry Nguyen, San Francisco, CA (US); Michael David Kuiper, Newark, CA (US); Evan Michael Wray, Cotati, CA (US); Lewis Abra, San Francisco, CA (US); Peter Clemente, San Francisco, CA (US); Brian West, San Francisco, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 17/668,636

(22) Filed: Feb. 10, 2022

(65) Prior Publication Data

US 2022/0166372 A1 May 26, 2022

Related U.S. Application Data

(63) Continuation of application No. 17/168,726, filed on Feb. 5, 2021, now Pat. No. 11,251,744.
(Continued)

(51) Int. Cl.
*E04D 1/28* (2006.01)
*H02S 20/25* (2014.01)
(Continued)

(52) U.S. Cl.
CPC ............... *H02S 20/25* (2014.12); *E04D 1/26* (2013.01); *E04D 1/28* (2013.01); *E04D 1/30* (2013.01);
(Continued)

(58) Field of Classification Search
CPC ......... Y02E 10/50; Y02E 10/47; Y02B 10/10; H02S 20/25; H02S 40/36; E04D 1/28;
(Continued)

(56) References Cited

U.S. PATENT DOCUMENTS

| 4,349,220 A | 9/1982 | Carroll et al. |
| 4,636,577 A | 1/1987 | Peterpaul |

(Continued)

FOREIGN PATENT DOCUMENTS

| CA | 2829440 A1 | 4/2014 |
| CH | 700095 A2 | 6/2010 |

(Continued)

OTHER PUBLICATIONS

Sunflare, Procducts: "Sunflare Develops Prototype for New Residential Solar Shingles"; 2019 <<sunflaresolar.com/news/sunflare-develops-prototype-for-new-residential-solar-shingles>> retrieved Feb. 2, 2021.
(Continued)

*Primary Examiner* — Brian E Glessner
*Assistant Examiner* — Daniel J Kenny
(74) *Attorney, Agent, or Firm* — Greenberg Traurig, LLP

(57) ABSTRACT

A system includes a plurality of photovoltaic shingles installed on a roof deck, each of the shingles having a first layer including a head lap portion, and a second layer including at least one solar cell. A first photovoltaic shingle overlays at least a part of the head lap portion of a second photovoltaic shingle. The system includes at least one wireway installed proximate to a first end of at least the first photovoltaic shingle.

30 Claims, 29 Drawing Sheets

Related U.S. Application Data

(60) Provisional application No. 63/074,268, filed on Sep. 3, 2020, provisional application No. 63/034,530, filed on Jun. 4, 2020.

(51) Int. Cl.

| | | |
|---|---|---|
| *H02S 40/36* | (2014.01) | |
| *E04D 1/30* | (2006.01) | |
| *E04D 1/34* | (2006.01) | |
| *E04D 1/26* | (2006.01) | |
| *E04D 13/17* | (2006.01) | |

(52) U.S. Cl.
CPC ............... *E04D 1/34* (2013.01); *H02S 40/36* (2014.12); *E04D 13/17* (2013.01); *E04D 2001/308* (2013.01); *E04D 2001/3423* (2013.01); *E04D 2001/3435* (2013.01)

(58) Field of Classification Search
CPC ..... E04D 1/30; E04D 1/34; E04D 2001/3423; E04D 2001/308; E04D 2001/3435
See application file for complete search history.

(56) References Cited

U.S. PATENT DOCUMENTS

| | | | |
|---|---|---|---|
| 5,642,596 A | 7/1997 | Waddington | |
| 6,008,450 A | 12/1999 | Ohtsuka et al. | |
| 6,336,304 B1 | 1/2002 | Mimura et al. | |
| 6,341,454 B1 | 1/2002 | Koleoglou | |
| 6,619,006 B1 * | 9/2003 | Shirota | E04D 1/18 52/447 |
| 6,928,781 B2 | 8/2005 | Desbois et al. | |
| 6,972,367 B2 | 12/2005 | Federspiel et al. | |
| 7,155,870 B2 | 1/2007 | Almy | |
| 7,178,295 B2 | 2/2007 | Dinwoodie | |
| 7,331,150 B2 * | 2/2008 | Martinique | E04D 1/30 52/525 |
| 7,487,771 B1 | 2/2009 | Eiffert et al. | |
| 7,587,864 B2 | 9/2009 | McCaskill et al. | |
| 7,678,990 B2 | 3/2010 | McCaskill et al. | |
| 7,678,991 B2 | 3/2010 | McCaskill et al. | |
| 7,748,191 B2 | 7/2010 | Podirsky | |
| 7,819,114 B2 | 10/2010 | Augenbraun et al. | |
| 7,824,191 B1 | 11/2010 | Browder | |
| 7,832,176 B2 | 11/2010 | McCaskill et al. | |
| 8,210,570 B1 | 7/2012 | Railkar et al. | |
| 8,371,076 B2 | 2/2013 | Jones et al. | |
| 8,468,754 B2 | 6/2013 | Railkar et al. | |
| 8,505,249 B2 | 8/2013 | Geary | |
| 8,512,866 B2 | 8/2013 | Taylor | |
| 8,667,758 B2 * | 3/2014 | Fernandez Fernandez | E04D 1/14 52/549 |
| 8,713,860 B2 | 5/2014 | Railkar et al. | |
| 8,925,262 B2 | 1/2015 | Railkar et al. | |
| 8,925,272 B1 * | 1/2015 | Amatruda | E04D 1/2963 52/557 |
| 8,946,544 B2 | 2/2015 | Jacobs et al. | |
| 8,994,224 B2 | 3/2015 | Mehta et al. | |
| 9,169,646 B2 | 10/2015 | Rodrigues et al. | |
| 9,171,991 B2 | 10/2015 | Pearce | |
| 9,273,885 B2 | 3/2016 | Rodrigues et al. | |
| 9,359,014 B1 | 6/2016 | Yang et al. | |
| 9,605,432 B1 | 3/2017 | Robbins | |
| 9,711,672 B2 | 7/2017 | Wang | |
| 9,831,818 B2 | 11/2017 | West | |
| 9,912,284 B2 | 3/2018 | Svec | |
| 9,923,515 B2 | 3/2018 | Rodrigues et al. | |
| 9,938,729 B2 | 4/2018 | Coon | |
| 9,991,412 B2 | 6/2018 | Gonzalez et al. | |
| 10,027,273 B2 | 7/2018 | West et al. | |
| 10,115,850 B2 | 10/2018 | Rodrigues et al. | |
| 10,187,005 B2 | 1/2019 | Rodrigues et al. | |
| 10,256,765 B2 | 4/2019 | Rodrigues et al. | |
| D879,031 S | 3/2020 | Lance et al. | |
| D904,289 S | 12/2020 | Lance et al. | |
| 2002/0053360 A1 | 5/2002 | Kinoshita et al. | |
| 2002/0129849 A1 | 9/2002 | Heckeroth | |
| 2003/0217768 A1 | 11/2003 | Guha | |
| 2005/0115603 A1 | 6/2005 | Yoshida et al. | |
| 2005/0144870 A1 | 7/2005 | Dinwoodie | |
| 2006/0042683 A1 | 3/2006 | Gangemi | |
| 2007/0181174 A1 | 8/2007 | Ressler | |
| 2008/0006323 A1 | 1/2008 | Kalkanoglu et al. | |
| 2008/0035140 A1 | 2/2008 | Placer et al. | |
| 2008/0315061 A1 | 2/2008 | Placer et al. | |
| 2009/0019795 A1 | 1/2009 | Szacsvay et al. | |
| 2009/0044850 A1 | 2/2009 | Kimberly | |
| 2009/0114261 A1 | 5/2009 | Stancel et al. | |
| 2009/0159118 A1 | 6/2009 | Kalkanoglu | |
| 2010/0101634 A1 | 4/2010 | Frank et al. | |
| 2010/0313499 A1 | 12/2010 | Gangemi | |
| 2010/0326488 A1 | 12/2010 | Aue et al. | |
| 2011/0030761 A1 | 2/2011 | Kalkanoglu et al. | |
| 2011/0036386 A1 | 2/2011 | Browder | |
| 2011/0048507 A1 | 3/2011 | Livsey et al. | |
| 2011/0058337 A1 | 3/2011 | Han | |
| 2011/0132427 A1 | 6/2011 | Kalkanoglu et al. | |
| 2011/0239555 A1 | 10/2011 | Cook et al. | |
| 2011/0302859 A1 | 12/2011 | Crasnianski | |
| 2012/0060902 A1 | 3/2012 | Drake | |
| 2012/0137600 A1 | 6/2012 | Jenkins | |
| 2012/0176077 A1 | 7/2012 | Oh et al. | |
| 2012/0212065 A1 | 8/2012 | Cheng et al. | |
| 2012/0233940 A1 | 9/2012 | Perkins | |
| 2012/0240490 A1 | 9/2012 | Gangemi | |
| 2012/0260977 A1 | 10/2012 | Stancel | |
| 2013/0014455 A1 | 1/2013 | Grieco | |
| 2014/0352760 A1 | 12/2014 | Haynes et al. | |
| 2015/0349173 A1 | 12/2015 | Morad et al. | |
| 2016/0359451 A1 | 12/2016 | Mao et al. | |
| 2017/0159292 A1 | 6/2017 | Chihlas et al. | |
| 2018/0094438 A1 | 4/2018 | Wu et al. | |
| 2018/0097472 A1 | 4/2018 | Anderson et al. | |
| 2018/0351502 A1 | 12/2018 | Almy et al. | |
| 2020/0020819 A1 | 1/2020 | Farhangi | |
| 2020/0144958 A1 | 5/2020 | Rodrigues et al. | |
| 2020/0224419 A1 | 7/2020 | Boss et al. | |
| 2021/0115223 A1 | 4/2021 | Bonekamp et al. | |

FOREIGN PATENT DOCUMENTS

| | | |
|---|---|---|
| EP | 2784241 A1 | 10/2014 |
| JP | 2001-098703 A | 4/2001 |
| WO | 2011/049944 A1 | 4/2011 |
| WO | 2015/133632 A | 9/2015 |

OTHER PUBLICATIONS

RGS Energy, 3.5kW Powerhouse 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

* cited by examiner

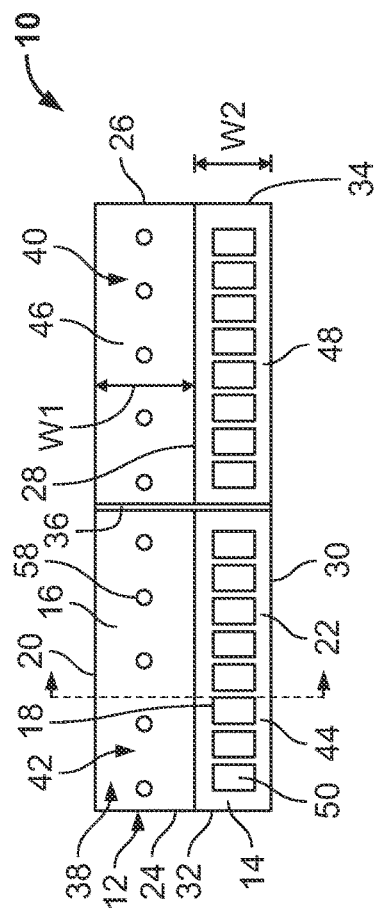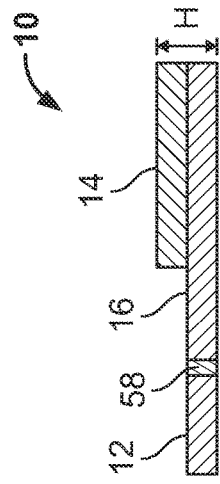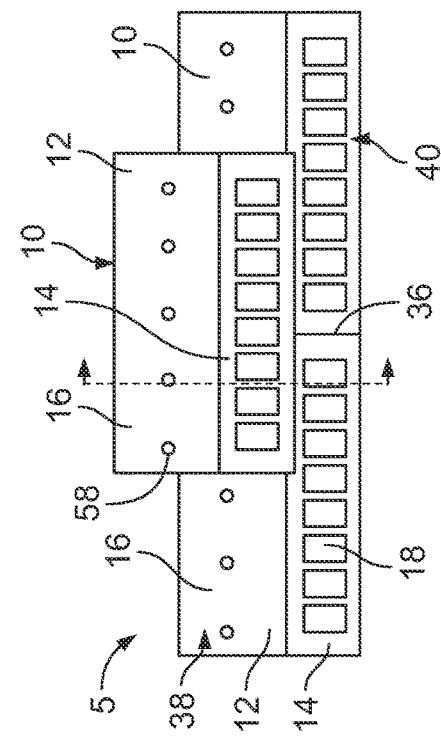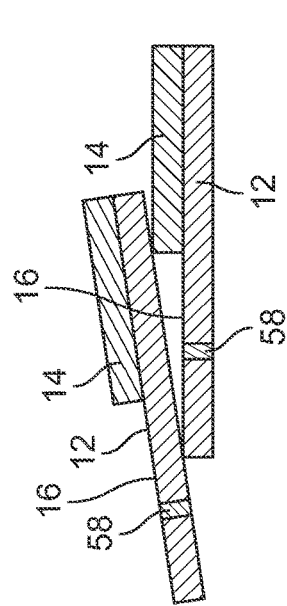

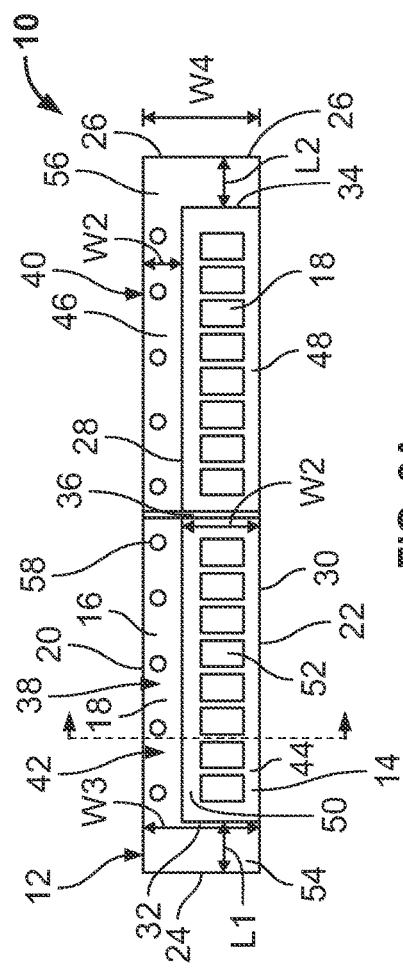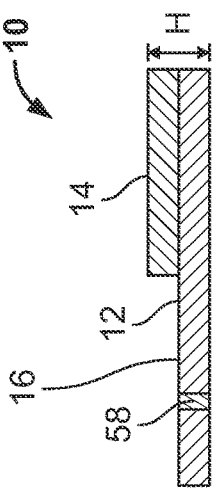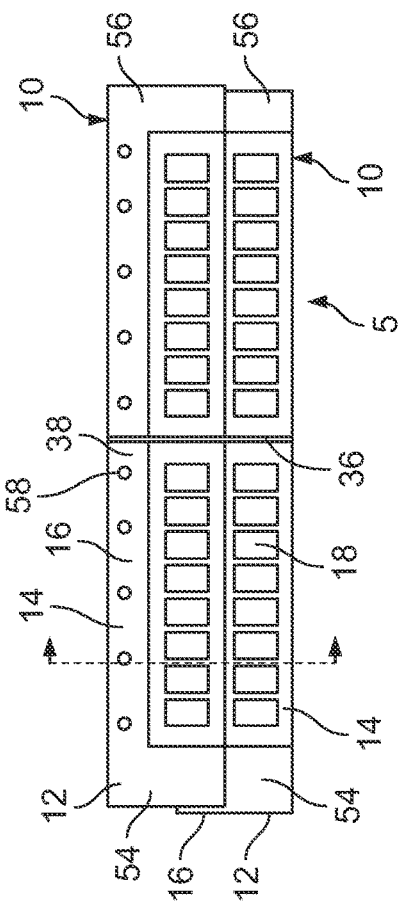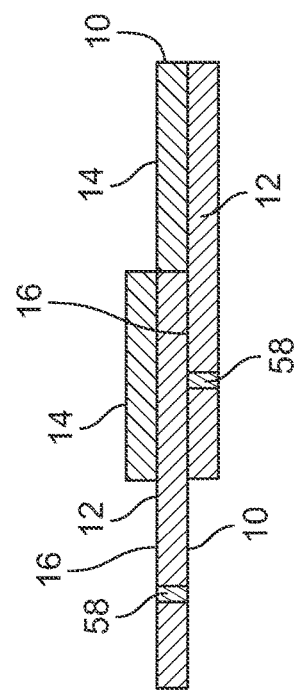

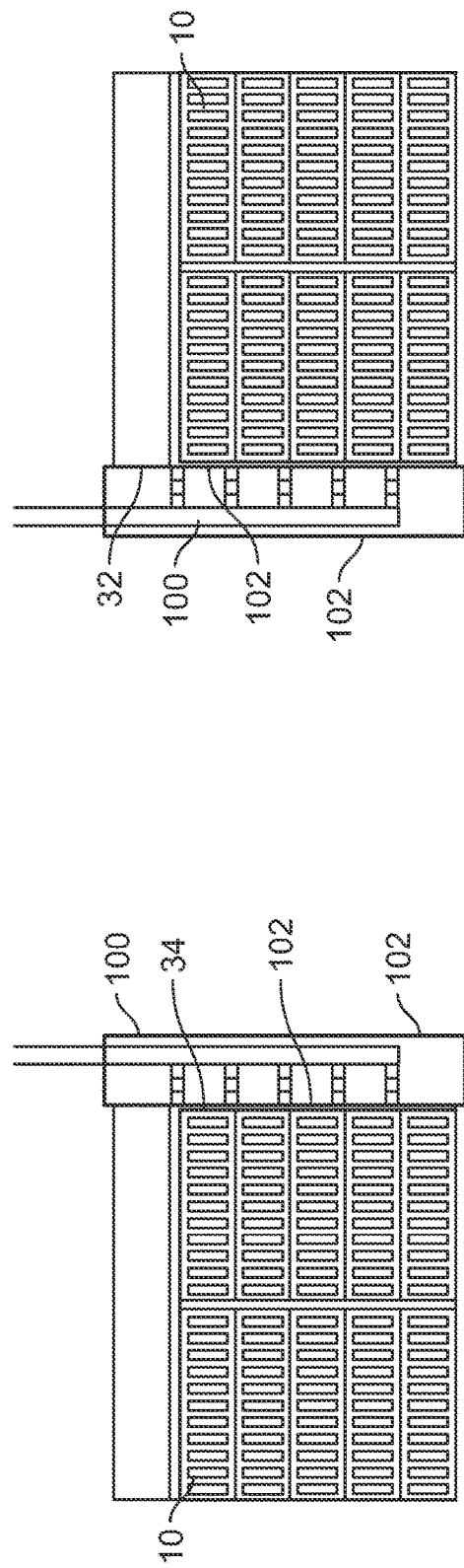
FIG. 3A
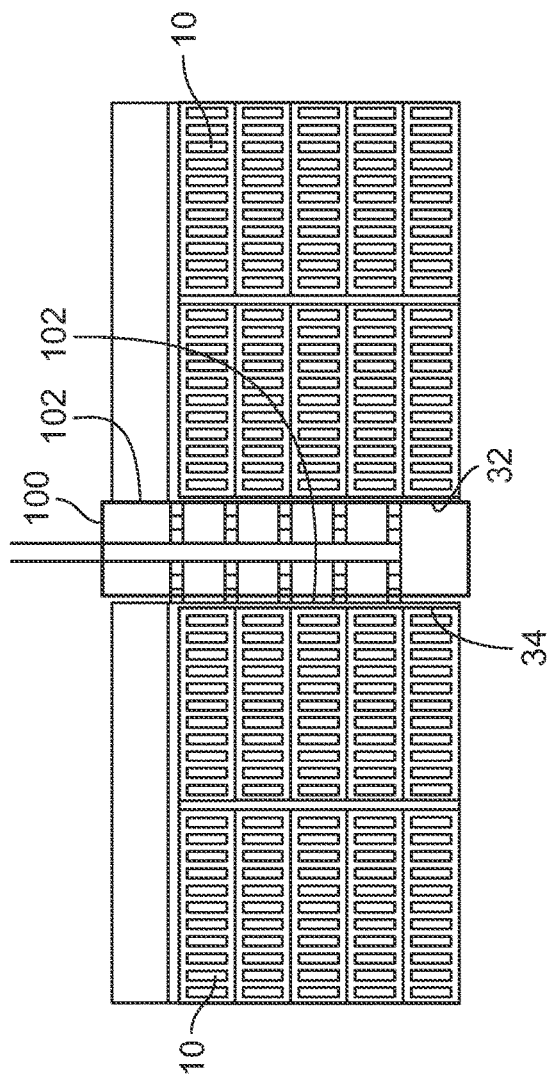
FIG. 3B
FIG. 3C

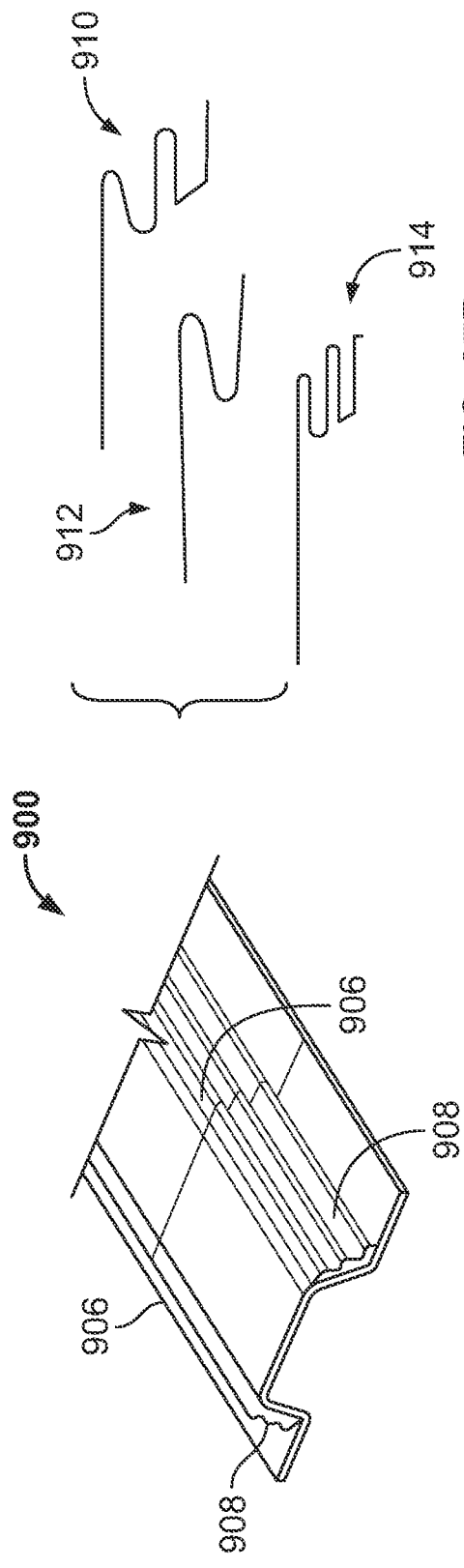
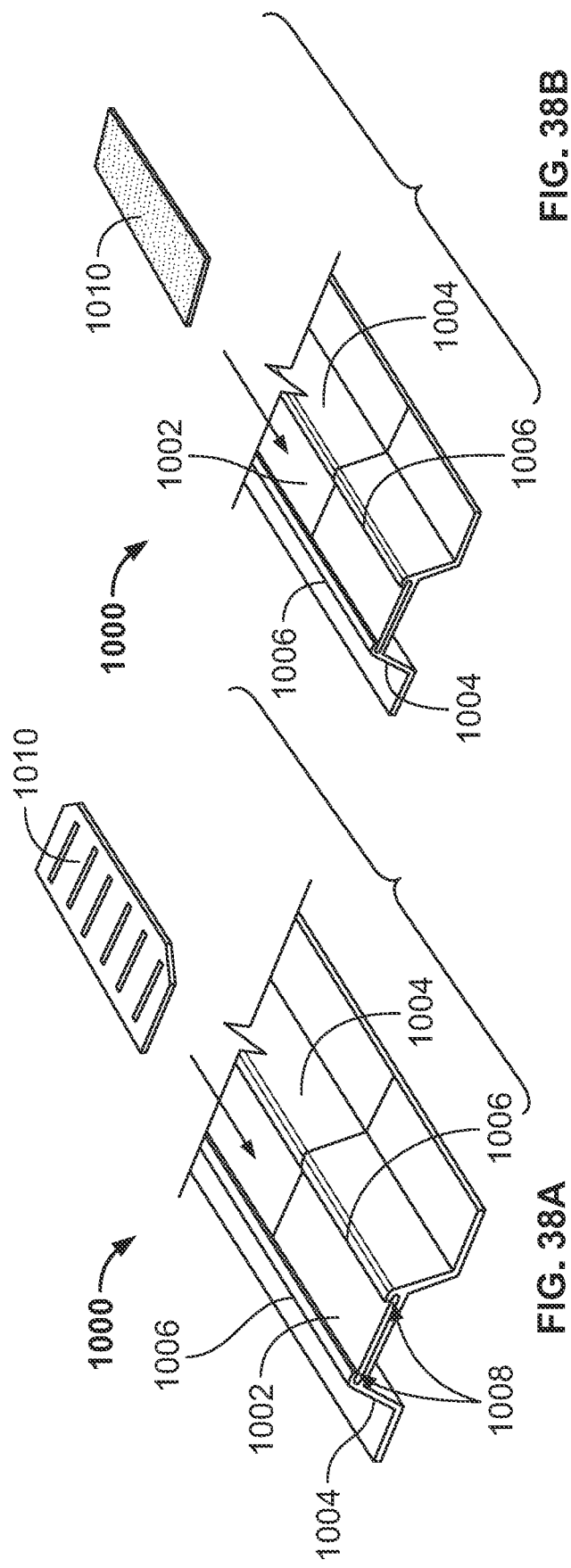
FIG. 37A
FIG. 37B
FIG. 38A
FIG. 38B

PHOTOVOLTAIC SHINGLES AND METHODS OF INSTALLING SAME

CROSS-REFERENCE TO RELATED APPLICATION

This application is a continuation of U.S. patent application Ser. No. 17/168,726, filed Feb. 5, 2021, entitled "PHOTOVOLTAIC SHINGLES AND METHODS OF INSTALLING SAME", which claims the benefit of U.S. Provisional Patent Application Ser. No. 63/074,268, filed Sep. 3, 2020, entitled "PHOTOVOLTAIC SHINGLES AND METHODS OF INSTALLING SAME," and U.S. Provisional Patent Application Ser. No. 63/034,530, filed Jun. 4, 2020, entitled "DIRECT TO DECK SOLAR ROOFING SYSTEMS," the contents of which are incorporated herein by reference in their entirety.

FIELD OF THE INVENTION

The present invention relates to photovoltaic shingles and, more particularly, photovoltaic shingles for roofing systems and methods for installing same.

BACKGROUND OF THE INVENTION

Photovoltaic systems having solar panels are commonly installed on roofing of structures. What is needed is a photovoltaic shingle having features for efficient installation thereof.

SUMMARY OF THE INVENTION

In an embodiment, a method comprising the steps of obtaining a plurality of photovoltaic shingles; wherein each photovoltaic shingle of the plurality of the photovoltaic shingles includes a first end, a first layer including a head lap portion, a second layer overlaying the first layer, wherein the second layer includes at least one solar cell, laying a first photovoltaic shingle of the plurality of photovoltaic shingles directly on a deck surface of a steep slope roof; attaching the first photovoltaic shingle of the plurality of photovoltaic shingles to the deck surface of the steep slope roof; laying a second photovoltaic shingle of the plurality of photovoltaic shingles over at least a part of the head lap portion of the first photovoltaic shingle of the plurality of photovoltaic shingles; and attaching the second photovoltaic shingle to the deck surface of the steep slope roof to form a roof integrated photovoltaic system.

In an embodiment, the method further includes the step of after forming the roof integrated photovoltaic system, installing at least one wireway proximate to the first end of the first photovoltaic shingle of the plurality of photovoltaic shingles. In an embodiment, the installed at least one wireway and formed roof integrated photovoltaic system conforms to standards under ASTM E 96, Procedure B test standards. In an embodiment, the first photovoltaic shingle of the plurality of photovoltaic shingles is attached to the deck surface by a plurality of fasteners. In an embodiment, the plurality of fasteners includes a plurality of nails, rivets, screws, staples or combinations thereof. In an embodiment, the first photovoltaic shingle of the plurality of photovoltaic shingles is attached to the deck surface by an adhesive. In an embodiment, the at least one solar cell includes a plurality of solar cells.

In an embodiment, the first layer includes a polymer. In an embodiment, the polymer of the first layer includes thermoplastic polyolefin (TPO). In an embodiment, the polymer of the first layer includes a material selected from the group consisting of polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide; polyvinyl chloride (PVC); ethylene propylene diene monomer (EPDM) rubber; silicone rubber; fluoropolymers—ethylene tetrafluoroethylene (ETFE), polyvinylidene fluoride (PVDF); tetrafluoroethylene-hexafluoropropylene copolymers (FEP), and tetrafluoroethylene-hexafluoropropylene-vinylidene fluoride copolymers (THV), and blends thereof. In an embodiment, none of the plurality of photovoltaic shingles is installed by a mechanical fastener. In an embodiment, the method further includes the step of installing a plurality of roofing shingles on the deck surface. In an embodiment, the plurality of roofing shingles is asphalt shingles. In an embodiment, each of the plurality of photovoltaic shingles is coplanar with the plurality of roofing shingles.

In an embodiment, the method further includes the step of laying a third photovoltaic shingle of the plurality of photovoltaic shingles over at least a part of the head lap portion of the second photovoltaic shingle of the plurality of photovoltaic shingles. In an embodiment, the deck surface includes an underlayment.

In an embodiment, a system includes a roof deck; a plurality of photovoltaic shingles installed on the roof deck, wherein each photovoltaic shingle of the plurality of photovoltaic shingles includes a first end, a second end opposite the first end, a first edge extending from the first end to the second end, and a second edge opposite the first edge and extending from the first end to the second end, a first layer including a head lap portion, wherein the head lap portion extends from the first end to the second end and from the first edge to a location intermediate the first edge and the second edge, a second layer overlaying the first layer, wherein the second layer includes at least one solar cell, and wherein a first photovoltaic shingle of the plurality of photovoltaic shingles overlays at least a part of the head lap portion of a second photovoltaic shingle of the plurality of photovoltaic shingles; and at least one wireway installed proximate to the first end of at least the first photovoltaic shingle.

In an embodiment, the at least one wireway is installed intermediate the first end of the first photovoltaic shingle and a second end of third photovoltaic shingle of the plurality of photovoltaic shingles. In an embodiment, the at least one wireway includes a lid, and wherein the lid is removably attached to the at least one wireway. In an embodiment, the at least one wireway includes at least one slot and the lid includes at least one rail, and wherein the at least one slot removably receives the at least one rail. In an embodiment, the lid includes a plurality of louvers. In an embodiment, the at least one wireway includes an inner surface having at least one support member extending outwardly therefrom. In an embodiment, the at least one wireway includes a plurality of wireways, and wherein one of the lids of one of the plurality of wireways overlaps another of the lids of another of the plurality of wireways. In an embodiment, each of the plurality of photovoltaic shingles incudes a side lap, and wherein the at least one wireway overlays a corresponding one of the side laps. In an embodiment, the at least one wireway includes a height in a range of 1 mm to 20 mm. In an embodiment, the at least one wireway includes a single wireway installed proximate to the first end of each of the plurality of photovoltaic shingles. In an embodiment, the at least one wireway is moisture resistant.

BRIEF DESCRIPTION OF THE DRAWINGS

FIGS. 1A through 1D are top plan and cross-sectional views of an embodiment of a photovoltaic shingle and an embodiment of a system of photovoltaic shingles;

FIGS. 2A through 2D are top plan views and cross-sectional views of another embodiment of a photovoltaic shingle and another embodiment of a system of photovoltaic shingles;

FIGS. 3A through 3E are embodiments of photovoltaic shingles and associated wireways employed by the photovoltaic shingles;

FIGS. 37A and 37B illustrate an embodiment of a lid for a wireway; and

FIGS. 38A and 38B illustrate an embodiment of a lid for a wireway.

DETAILED DESCRIPTION

Figure 3D:
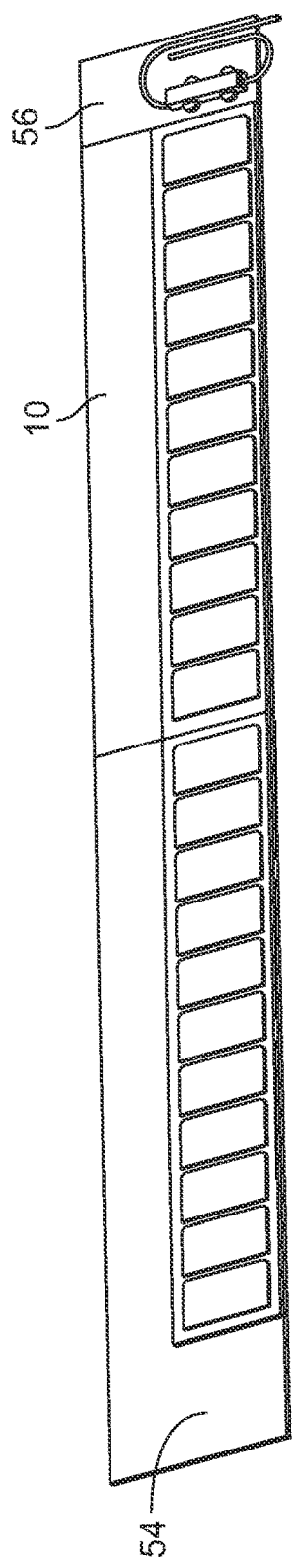
Figure 3E:
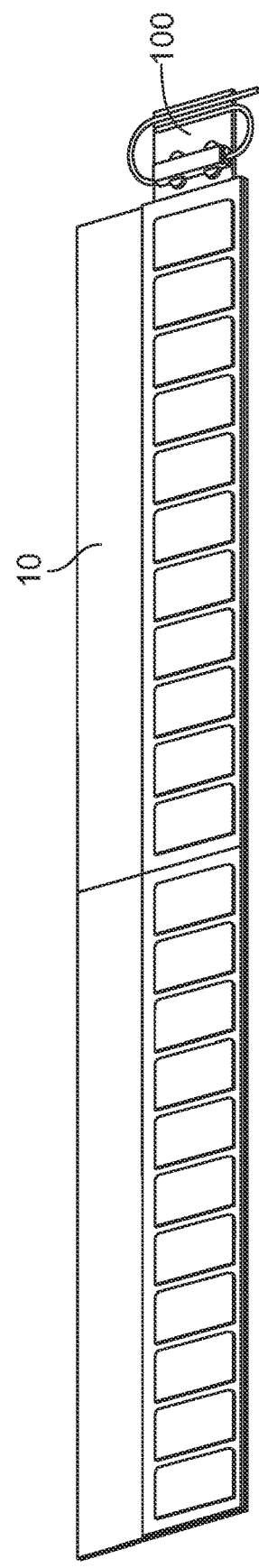
Figure 4:
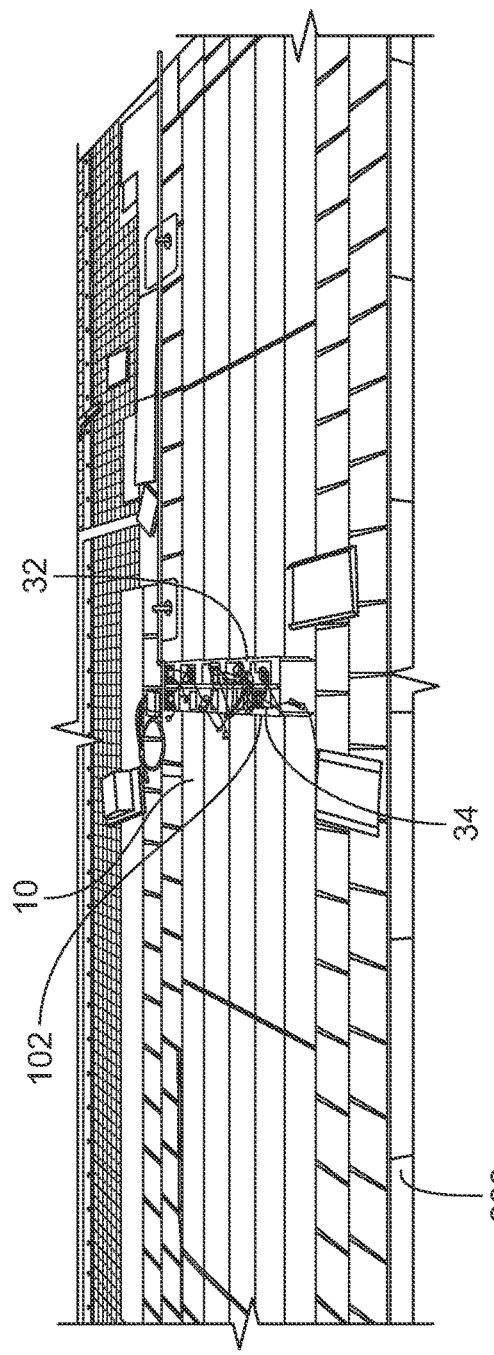
FIGS. 4 and 5 are embodiments of roofing systems including photovoltaic shingles and associated wireways.
Figure 5:
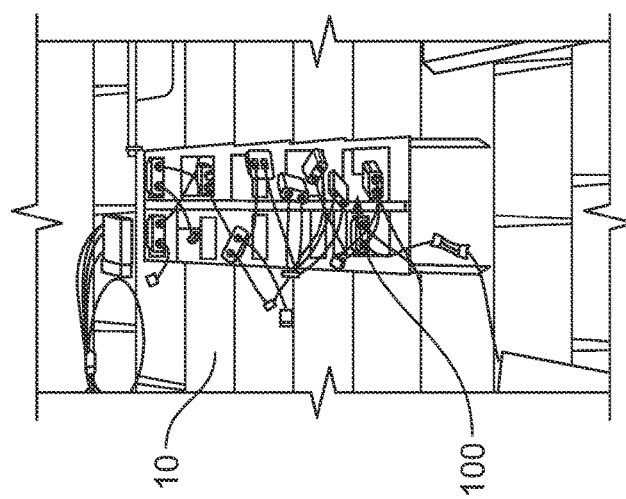

Referring to FIGS. 1A through 2D, in an embodiment, a roofing system 5 includes a plurality of photovoltaic shingles 10, each of which includes a first layer 12 and a second layer 14 overlaying the first layer 12. In an embodiment, the first layer 12 includes a head lap 16. In an embodiment, the second layer 14 includes at least one solar cell 18. In an embodiment, the at least one solar cell 18 includes a plurality of the solar cells 18. In an embodiment, at least one of the plurality of photovoltaic shingles 10 overlays at least the head lap 16 of another of the plurality of photovoltaic shingles 10.

Still referring to FIGS. 1A through 2D, in an embodiment, the first layer 12 includes a first end 20, a second end 22 opposite the first end 20, a third end 24 extending from the first end 20 of to the second end 22, and a fourth end 26 opposite the third end 24 and extending from the first end 20 to the second end 22. In an embodiment, the head lap 16 extends from the third end 24 to the fourth end 26. In an embodiment, the second layer 14 extends from the third end 24 of the first layer 12 to the fourth end 26 of the first layer 12. In another embodiment, the second layer 14 extends intermediate the third and fourth ends 24, 26 of the first layer 12. In an embodiment, the second layer 14 is located proximate to the second end 22 of the first layer 12.

In an embodiment, the second layer 14 includes a first end 28, a second end 30 opposite the first end 28, a third end 32 extending from the first end 28 to the second end 30, and a fourth end 34 opposite the third end 32 and extending from the first end 28 to the second end 30. In an embodiment, the second end 30 of the second layer 14 is substantially aligned with the second end 22 of the first layer 12.

In an embodiment, the head lap 16 includes a first width W1 and the second layer 14 includes a second width W2. In an embodiment, the first width W1 extends from the first end 20 of the first layer 12 to the first end 28 of the second layer 14. In an embodiment, the second width W2 extends from the first end 28 of the second layer 14 to the second end 30 of the second layer 14. In an embodiment, the first width W1 is greater than the second width W2. In another embodiment, the second width W2 is greater than the first width W1. In another embodiment, the first width W1 and the second width W2 are equal to one another.

In an embodiment, the first width W1 is in a range of 1 inch to 10 inches. In another embodiment, the first width W1 is in a range of 2 inches to 10 inches. In another embodiment, the first width W1 is in a range of 3 inches to 10 inches. In another embodiment, the first width W1 is in a range of 4 inches to 10 inches. In another embodiment, the first width W1 is in a range of 5 inches to 10 inches. In another embodiment, the first width W1 is in a range of 6 inches to 10 inches. In another embodiment, the first width W1 is in a range of 7 inches to 10 inches. In another embodiment, the first width W1 is in a range of 8 inches to 10 inches. In another embodiment, the first width W1 is in a range of 9 inches to 10 inches.

In an embodiment, the first width W1 is in a range of 1 inch to 9 inches. In another embodiment, the first width W1 is in a range of 2 inches to 9 inches. In another embodiment, the first width W1 is in a range of 3 inches to 9 inches. In another embodiment, the first width W1 is in a range of 4 inches to 9 inches. In another embodiment, the first width W1 is in a range of 5 inches to 9 inches. In another embodiment, the first width W1 is in a range of 6 inches to 9 inches. In another embodiment, the first width W1 is in a range of 7 inches to 9 inches. In another embodiment, the first width W1 is in a range of 8 inches to 9 inches.

In an embodiment, the first width W1 is in a range of 1 inch to 8 inches. In another embodiment, the first width W1 is in a range of 2 inches to 8 inches. In another embodiment, the first width W1 is in a range of 3 inches to 8 inches. In another embodiment, the first width W1 is in a range of 4 inches to 8 inches. In another embodiment, the first width W1 is in a range of 5 inches to 8 inches. In another embodiment, the first width W1 is in a range of 6 inches to 8 inches. In another embodiment, the first width W1 is in a range of 7 inches to 8 inches.

In an embodiment, the first width W1 is in a range of 1 inch to 7 inches. In another embodiment, the first width W1 is in a range of 2 inches to 7 inches. In another embodiment, the first width W1 is in a range of 3 inches to 7 inches. In another embodiment, the first width W1 is in a range of 4 inches to 7 inches. In another embodiment, the first width W1 is in a range of 5 inches to 7 inches. In another embodiment, the first width W1 is in a range of 6 inches to 7 inches.

In an embodiment, the first width W1 is in a range of 1 inch to 6 inches. In another embodiment, the first width W1 is in a range of 2 inches to 6 inches. In another embodiment, the first width W1 is in a range of 3 inches to 6 inches. In another embodiment, the first width W1 is in a range of 4 inches to 6 inches. In another embodiment, the first width W1 is in a range of 5 inches to 6 inches.

In an embodiment, the first width W1 is in a range of 1 inch to 5 inches. In another embodiment, the first width W1 is in a range of 2 inches to 5 inches. In another embodiment, the first width W1 is in a range of 3 inches to 5 inches. In another embodiment, the first width W1 is in a range of 4 inches to 5 inches.

In an embodiment, the first width W1 is in a range of 1 inch to 4 inches. In another embodiment, the first width W1 is in a range of 2 inches to 4 inches. In another embodiment, the first width W1 is in a range of 3 inches to 4 inches. In an embodiment, the first width W1 is in a range of 1 inch to 3 inches. In another embodiment, the first width W1 is in a range of 2 inches to 3 inches. In an embodiment, the first width W1 is in a range of 1 inch to 2 inches.

In an embodiment, the first width W1 is 1 inch. In another embodiment, the first width W1 is 2 inches. In another embodiment, the first width W1 is 3 inches. In another embodiment, the first width W1 is 4 inches. In another embodiment, the first width W1 is 5 inches. In another embodiment, the first width W1 is 6 inches. In another embodiment, the first width W1 is 7 inches. In another embodiment, the first width W1 is 8 inches. In another embodiment, the first width W1 is 9 inches. In another embodiment, the first width W1 is 10 inches.

In an embodiment, the second width W2 is in a range of 1 inch to 10 inches. In another embodiment, the second width W2 is in a range of 2 inches to 10 inches. In another embodiment, the second width W2 is in a range of 3 inches to 10 inches. In another embodiment, the second width W2 is in a range of 4 inches to 10 inches. In another embodiment, the second width W2 is in a range of 5 inches to 10 inches. In another embodiment, the second width W2 is in a range of 6 inches to 10 inches. In another embodiment, the second width W2 is in a range of 7 inches to 10 inches. In another embodiment, the second width W2 is in a range of 8 inches to 10 inches. In another embodiment, the second width W2 is in a range of 9 inches to 10 inches.

In an embodiment, the second width W2 is in a range of 1 inch to 9 inches. In another embodiment, the second width W2 is in a range of 2 inches to 9 inches. In another embodiment, the second width W2 is in a range of 3 inches to 9 inches. In another embodiment, the second width W2 is in a range of 4 inches to 9 inches. In another embodiment, the second width W2 is in a range of 5 inches to 9 inches. In another embodiment, the second width W2 is in a range of 6 inches to 9 inches. In another embodiment, the second width W2 is in a range of 7 inches to 9 inches. In another embodiment, the second width W2 is in a range of 8 inches to 9 inches.

In an embodiment, the second width W2 is in a range of 1 inch to 8 inches. In another embodiment, the second width W2 is in a range of 2 inches to 8 inches. In another embodiment, the second width W2 is in a range of 3 inches to 8 inches. In another embodiment, the second width W2 is in a range of 4 inches to 8 inches. In another embodiment, the second width W2 is in a range of 5 inches to 8 inches. In another embodiment, the second width W2 is in a range of 6 inches to 8 inches. In another embodiment, the second width W2 is in a range of 7 inches to 8 inches.

In an embodiment, the second width W2 is in a range of 1 inch to 7 inches. In another embodiment, the second width W2 is in a range of 2 inches to 7 inches. In another embodiment, the second width W2 is in a range of 3 inches to 7 inches. In another embodiment, the second width W2 is in a range of 4 inches to 7 inches. In another embodiment, the second width W2 is in a range of 5 inches to 7 inches. In another embodiment, the second width W2 is in a range of 6 inches to 7 inches.

In an embodiment, the second width W2 is in a range of 1 inch to 6 inches. In another embodiment, the second width W2 is in a range of 2 inches to 6 inches. In another embodiment, the second width W2 is in a range of 3 inches to 6 inches. In another embodiment, the second width W2 is in a range of 4 inches to 6 inches. In another embodiment, the second width W2 is in a range of 5 inches to 6 inches.

In an embodiment, the second width W2 is in a range of 1 inch to 5 inches. In another embodiment, the second width W2 is in a range of 2 inches to 5 inches. In another embodiment, the second width W2 is in a range of 3 inches to 5 inches. In another embodiment, the second width W2 is in a range of 4 inches to 5 inches.

In an embodiment, the second width W2 is in a range of 1 inch to 4 inches. In another embodiment, the second width W2 is in a range of 2 inches to 4 inches. In another embodiment, the second width W2 is in a range of 3 inches to 4 inches. In an embodiment, the second width W2 is in a range of 1 inch to 3 inches. In another embodiment, the second width W2 is in a range of 2 inches to 3 inches. In an embodiment, the second width W2 is in a range of 1 inch to 2 inches.

In an embodiment, the second width W2 is 1 inch. In another embodiment, the second width W2 is 2 inches. In another embodiment, the second width W2 is 3 inches. In another embodiment, the second width W2 is 4 inches. In another embodiment, the second width W2 is 5 inches. In another embodiment, the second width W2 is 6 inches. In another embodiment, the second width W2 is 7 inches. In another embodiment, the second width W2 is 8 inches. In another embodiment, the second width W2 is 9 inches. In another embodiment, the second width W2 is 10 inches.

Still referring to FIGS. 1A through 2D, in an embodiment, each of the plurality of photovoltaic shingles 10 includes a fold line 36 extending from the first end 20 of the first layer 12 to the second end 22 of the first layer 12 and intermediate the third and fourth ends 24, 26 of the first layer 12. In an embodiment, the fold line 36 extends from and through the first end 28 of the second layer 14 to the second end 30 of the second layer 14. In an embodiment, the fold line 36 enables the photovoltaic shingle 10 to be folded in half for reduction of space in connection with the storage or transport of the photovoltaic shingle 10. In an embodiment, each of the plurality of photovoltaic shingles 10 includes a first section 38 extending from the third end 24 of the first layer 12 to the fold line 36, and a second section 40 extending from the fourth end 26 of the first layer 12 to the fold line 36. In an embodiment, the first section 38 includes a first portion 42 of the head lap 16 and a first portion 44 of the second layer 14, and the second section 40 includes a second portion 46 of the head lap 16 and a second portion 48 of the second layer 14. In an embodiment, the at least one solar cell 18 includes a first one 50 of the at least one solar cell 18 located in the first portion 44 of the second layer 14 and a second one 52 of the at least one solar cell 18 located in the second portion 48 of the second layer 14. In an embodiment, the first one 50 of the at least one solar cell 18 includes a first plurality of solar cells 18, and the second one 52 of the at least one solar cell 18 includes a second plurality of solar cells 18.

Referring to FIGS. 2A and 2C, in an embodiment, the second layer 14 extends intermediate the third and fourth ends 24, 26 of the first layer 12. In an embodiment, the first layer includes a first step flap 54 adjacent the third end 32 of the second layer 14 and a second step flap 56 adjacent the fourth end 34 of the second layer 14. In an embodiment, the first step flap 54 includes a length L1 extending from the third end 32 of the second layer 14 to the third end 24 of the first layer 12. In an embodiment, the first step flap 54 includes a width W3 extending from the first end 20 of the first layer 12 to the second end 22 of the first layer 12. In an embodiment, the second step flap 56 includes a length L2 extending from the fourth end 34 of the second layer 14 to the fourth end 26 of the first layer 12. In an embodiment, the second step flap 56 includes a width W4 extending from the first end 20 of the first layer 12 to the second end 22 of the first layer 12. In an embodiment, the width W3 is equal to the width W4. In an embodiment, the length L1 and is equal to the length L2. In an embodiment, the head lap 16, the first step flap 54, and the second step flap 56 are contiguous.

In another embodiment, the second layer 14 extends from the third end 24 of the first layer 12 to a location intermediate the third and fourth ends 24, 26 of the first layer 12. In an embodiment, the first layer 12 includes the second step flap 56 adjacent the fourth end 34 of the second layer 14. In an embodiment, the head lap 16 and the second step flap 56 are contiguous. In another embodiment, the second layer 14 extends from the fourth end 26 of the first layer 12 to a location intermediate the third and fourth ends 24, 26 of the first layer 12. In an embodiment, the first layer 12 includes the first step flap 54 adjacent the third end 32 of the second layer 14. In an embodiment, the head lap 16 and the first step flap 54 are contiguous.

In an embodiment, each of the first layer 12 and the second layer 14 includes a polymer. In an embodiment, each of the first layer 12 and the second layer 14 includes thermoplastic polyolefin (TPO). In other embodiments, each of the first layer 12 and the second layer 14 includes polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide; polyvinyl chloride (PVC); ethylene propylene diene monomer(EPDM) rubber; silicone rubber, fluoropolymers—ethylene tetrafluoroethylene (ETFE), poly vinylidene fluoride (PVDF), tetrafluoroethylene-hexafluoropropylene copolymers (FEP), and tetrafluoroethylene-hexafluoropropylene-vinylidene fluoride copolymers (THV), or blends thereof. In an embodiment, the first layer 12 and the second layer 14 are laminated. In an embodiment, the second layer 12 is ultrasonically welded to the first layer 12. In an embodiment, the second layer 14 is heat welded to the first layer 12. In an embodiment, the second layer 14 is thermally bonded to the first layer 12.

In an embodiment, an impact resistance of the photovoltaic shingle 10 is characterized by a Class 4 rating in accordance with the standards of ANSI FM 4473 test standards.

Figure 6:
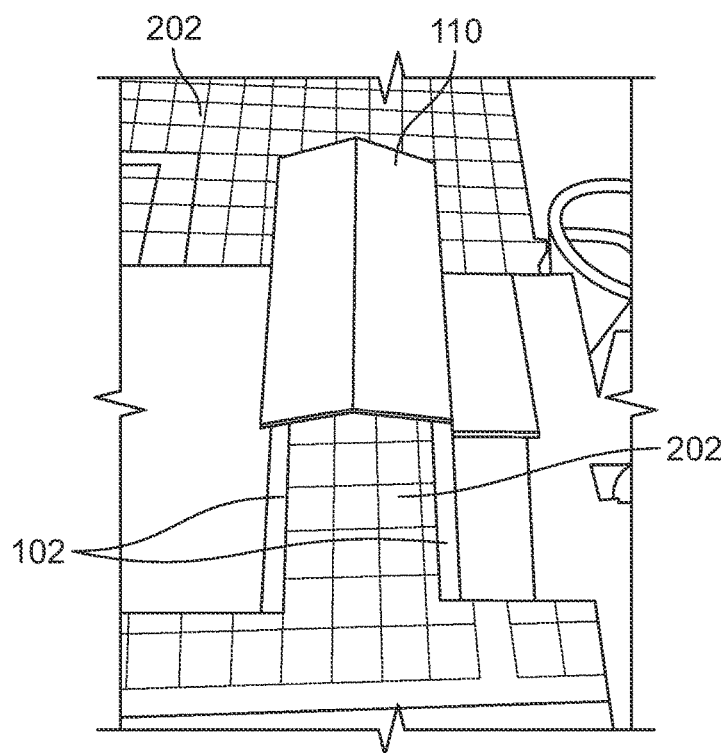
FIGS. 6 through 7B are embodiments of wireways having flashing and covers.
Figure 7A:
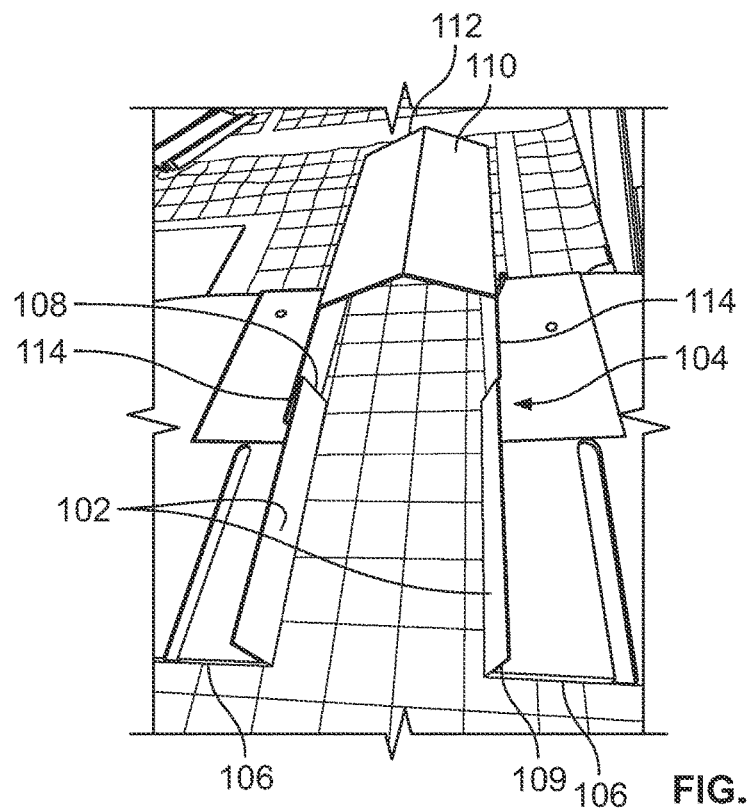
Figure 7B:
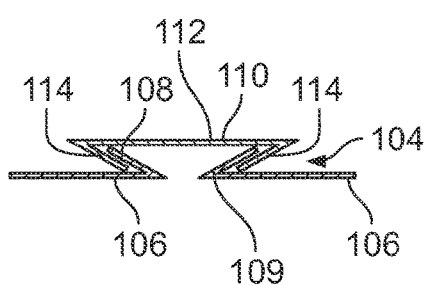
Figure 8:
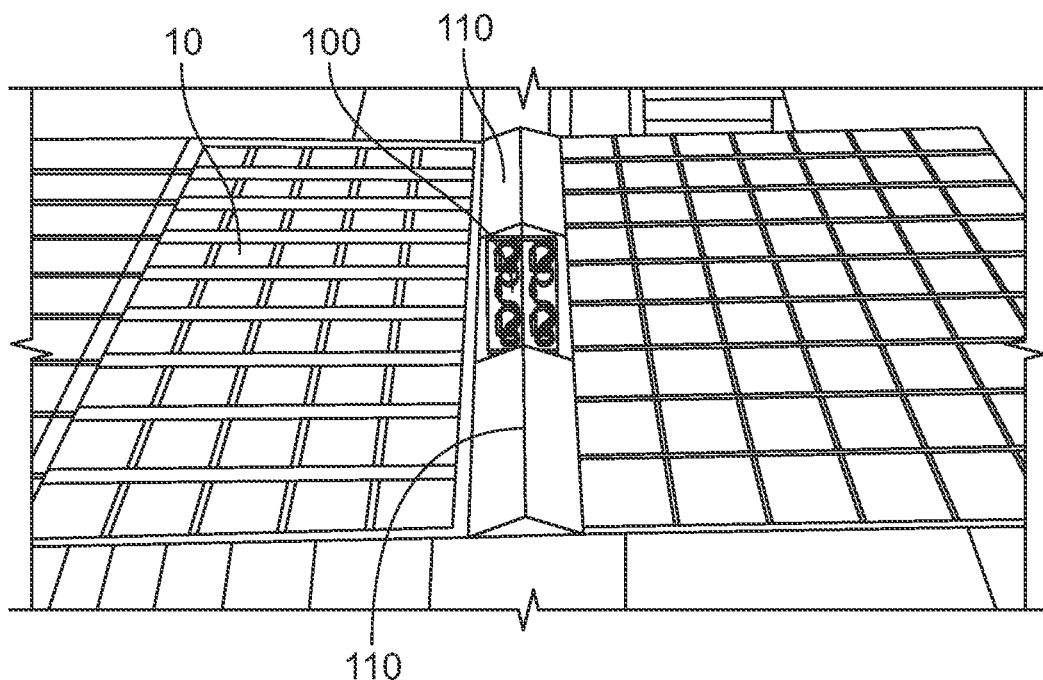
FIGS. 8 and 9 are embodiments of photovoltaic shingles having wireways and associated covers.
Figure 9:
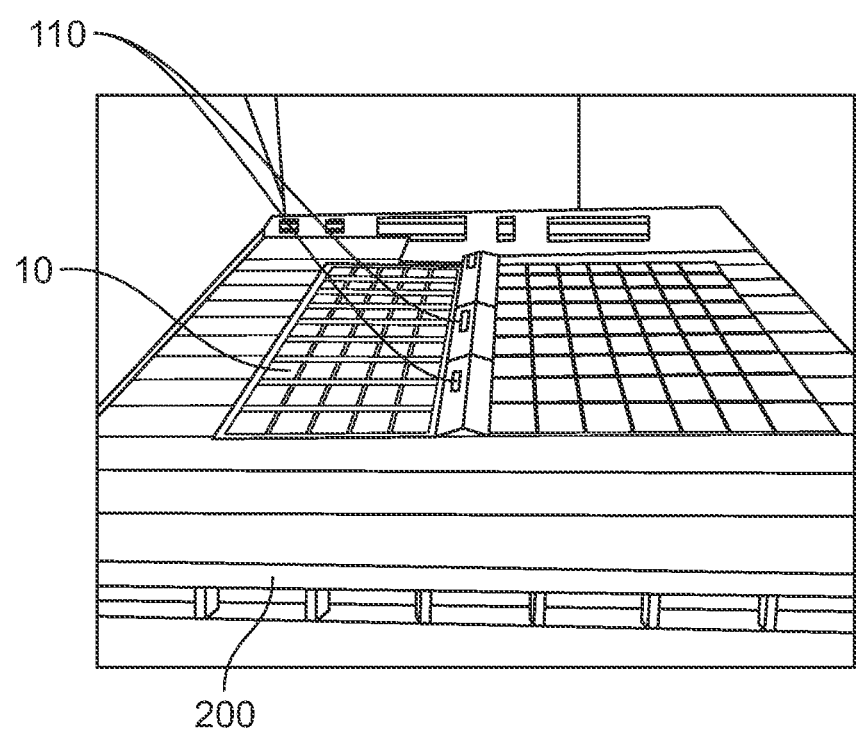
Figure 10:
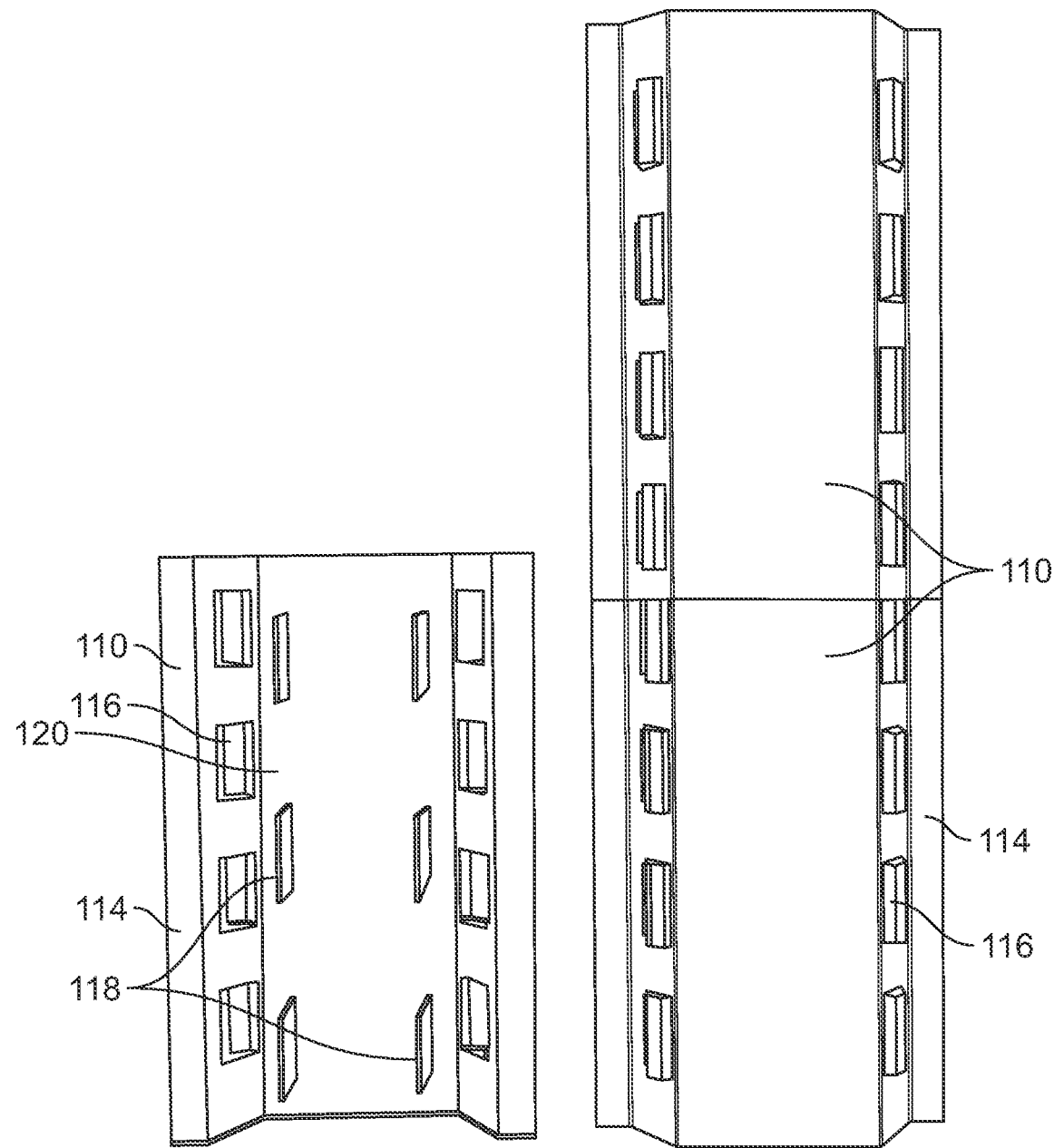
FIGS. 10 through 11 are embodiments of a wireway cover.
Figure 11:
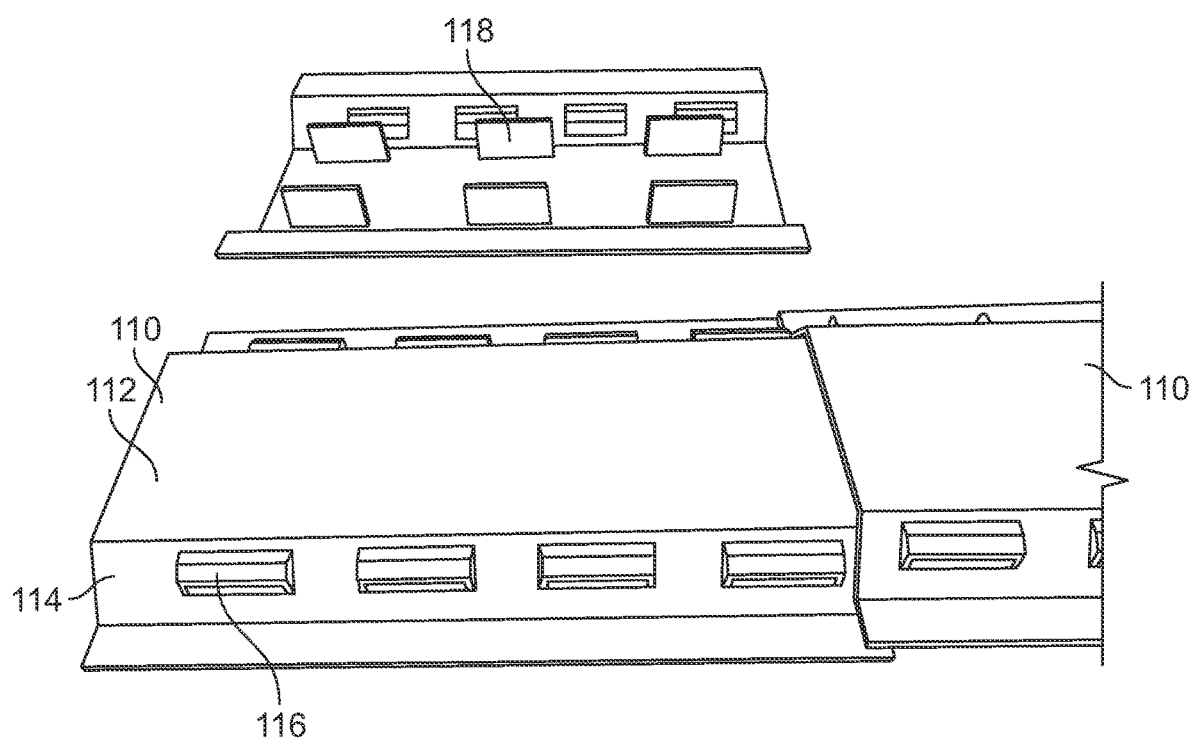

In an embodiment, the plurality of photovoltaic shingles 10 is installed on a roof deck 200. In an embodiment, the plurality of photovoltaic shingles 10 is installed directly to the roof deck 200. In an embodiment, each of the plurality of photovoltaic shingles 10 is installed on the roof deck 200 by a plurality of fasteners 58. In an embodiment, the plurality of fasteners 58 are installed through the head lap 16. In an embodiment, the plurality of fasteners 58 includes a plurality of nails. In another embodiment, each of the plurality of photovoltaic shingles 10 is installed on the roof deck 200 by an adhesive. In an embodiment, the system 5 includes an underlayment layer 202 installed on the roof deck 200 (see FIG. 6). In an embodiment, the plurality of photovoltaic shingles 10 overlay the underlayment layer 202.

Referring to FIGS. 1A through 1D, in an embodiment, one of the plurality of photovoltaic shingles 10 overlays the head lap 16 of another of the plurality of photovoltaic shingles 10. In an embodiment, one of the plurality of photovoltaic shingles 10 overlays the first section 38 and the second section 40 of the another of the of the plurality of photovoltaic shingles 10 for a staggered installation of the photovoltaic shingles 10. In an embodiment, the first section 38 of the one of the plurality of photovoltaic shingles 10 overlays the first section 38 and the second section 40 of the another of the of the plurality of photovoltaic shingles 10. In an embodiment, the second section 40 of the one of the plurality of photovoltaic shingles 10 overlays the first section 38 and the second section 40 of the another of the of the plurality of photovoltaic shingles 10.

Referring to FIGS. 2A through 2D, in another embodiment, the first step flap 54 of one of the plurality of photovoltaic shingles 10 overlays the first step flap 54 of another of the plurality of photovoltaic shingles 10, and the second step flap 56 of the one of the plurality of photovoltaic shingles 10 overlays the second step flap 56 of the another of the plurality of photovoltaic shingles 10 for a non-staggered installation of the photovoltaic shingles 10. In an embodiment, the first step flap 54 of the one of the plurality of photovoltaic shingles 10 substantially aligns with the first step flap 54 of the another of the plurality of photovoltaic shingles 10, and the second step flap 56 of the one of the plurality of photovoltaic shingles 10 substantially aligns with the second step flap 56 of the another of the plurality of photovoltaic shingles 10. In an embodiment, the third end 32 of the second layer 14 of the one of the plurality of photovoltaic shingles 10 substantially aligns with the third end 32 of the second layer 14 of the another of the plurality of photovoltaic shingles 10, and the fourth end 34 of the second layer 14 of the one of the plurality of photovoltaic shingles 10 substantially aligns with the fourth end 34 of the second layer 14 of the another of the plurality of photovoltaic shingles 10. In an embodiment, the second step flap 56 of one of the plurality of photovoltaic shingles 10 overlays the first step flap 54 of another of the plurality of photovoltaic shingles 10.

In an embodiment, each of the plurality of photovoltaic shingles 10 meets the standards of Florida Testing Application Standard (TAS) 100-95 when tested in accordance therewith.

In an embodiment, each of the plurality of photovoltaic shingles includes a height H1 in a range of 5 mm to 20 mm. In another embodiment, each of the plurality of photovoltaic shingles includes a height H1 in a range of 6 mm to 20 mm. In another embodiment, each of the plurality of photovoltaic shingles includes a height H1 in a range of 7 mm to 20 mm. In another embodiment, each of the plurality of photovoltaic shingles includes a height H1 in a range of 8 mm to 20 mm. In another embodiment, each of the plurality of photovoltaic shingles includes a height H1 in a range of 9 mm to 20 mm. In another embodiment, each of the plurality of photovoltaic shingles includes a height H1 in a range of 10 mm to 20 mm. In another embodiment, each of the plurality of photovoltaic shingles includes a height H1 in a range of 11 mm to 20 mm. In another embodiment, each of the plurality of photovoltaic shingles includes a height H1 in a range of 12 mm to 20 mm. In another embodiment, each of the plurality of photovoltaic shingles includes a height H1 in a range of 13 mm to 20 mm. In another embodiment, each of the plurality of photovoltaic shingles includes a height H1 in a range of 14 mm to 20 mm. In another embodiment, each of the plurality of photovoltaic shingles includes a height H1 in a range of 15 mm to 20 mm. In another embodiment, each of the plurality of photovoltaic shingles includes a height H1 in a range of 16 mm to 20 mm. In another embodiment, each of the plurality of photovoltaic shingles includes a height in a range of 17 mm to 20 mm. In another embodiment, each of the plurality of photovoltaic shingles includes a height H1 in a range of 18 mm to 20 mm. In another embodiment, each of the plurality of photovoltaic shingles includes a height H1 in a range of 19 mm to 20 mm.

In an embodiment, each of the plurality of photovoltaic shingles includes a height H1 in a range of 5 mm to 19 mm. In another embodiment, each of the plurality of photovoltaic shingles includes a height H1 in a range of 6 mm to 19 mm. In another embodiment, each of the plurality of photovoltaic shingles includes a height H1 in a range of 7 mm to 19 mm. In another embodiment, each of the plurality of photovoltaic shingles includes a height H1 in a range of 8 mm to 19 mm. In another embodiment, each of the plurality of photovoltaic shingles includes a height H1 in a range of 9 mm to 19 mm. In another embodiment, each of the plurality of photovoltaic shingles includes a height H1 in a range of 10 mm to 19 mm. In another embodiment, each of the plurality of photovoltaic shingles includes a height H1 in a range of 11 mm to 19 mm. In another embodiment, each of the plurality of photovoltaic shingles includes a height H1 in a range of 12 mm to 19 mm. In another embodiment, each of the plurality of photovoltaic shingles includes a height H1 in a range of 13 mm to 19 mm. In another embodiment, each of the plurality of photovoltaic shingles includes a height H1 in a range of 14 mm to 19 mm. In another embodiment, each of the plurality of photovoltaic shingles includes a height H1 in a range of 15 mm to 19 mm. In another embodiment, each of the plurality of photovoltaic shingles includes a height H1 in a range of 16 mm to 19 mm. In another embodiment, each of the plurality of photovoltaic shingles includes a height H1 in a range of 17 mm to 19 mm. In another embodiment, each of the plurality of photovoltaic shingles includes a height H1 in a range of 18 mm to 19 mm.

In an embodiment, each of the plurality of photovoltaic shingles includes a height H1 in a range of 5 mm to 18 mm. In another embodiment, each of the plurality of photovoltaic shingles includes a height H1 in a range of 6 mm to 18 mm. In another embodiment, each of the plurality of photovoltaic shingles includes a height H1 in a range of 7 mm to 18 mm. In another embodiment, each of the plurality of photovoltaic shingles includes a height H1 in a range of 8 mm to 18 mm. In another embodiment, each of the plurality of photovoltaic shingles includes a height H1 in a range of 9 mm to 18 mm. In another embodiment, each of the plurality of photovoltaic shingles includes a height H1 in a range of 10 mm to 18 mm. In another embodiment, each of the plurality of photovoltaic shingles includes a height H1 in a range of 11 mm to 18 mm. In another embodiment, each of the plurality of photovoltaic shingles includes a height H1 in a range of 12 mm to 18 mm. In another embodiment, each of the plurality of photovoltaic shingles includes a height H1 in a range of 13 mm to 18 mm. In another embodiment, each of the plurality of photovoltaic shingles includes a height H1 in a range of 14 mm to 18 mm. In another embodiment, each of the plurality of photovoltaic shingles includes a height H1 in a range of 15 mm to 18 mm. In another embodiment, each of the plurality of photovoltaic shingles includes a height H1 in a range of 16 mm to 18 mm. In another embodiment, each of the plurality of photovoltaic shingles includes a height H1 in a range of 17 mm to 18 mm.

In an embodiment, each of the plurality of photovoltaic shingles includes a height H1 in a range of 5 mm to 17 mm. In another embodiment, each of the plurality of photovoltaic shingles includes a height H1 in a range of 6 mm to 17 mm. In another embodiment, each of the plurality of photovoltaic shingles includes a height H1 in a range of 7 mm to 17 mm. In another embodiment, each of the plurality of photovoltaic shingles includes a height H1 in a range of 8 mm to 17 mm. In another embodiment, each of the plurality of photovoltaic shingles includes a height H1 in a range of 9 mm to 17 mm. In another embodiment, each of the plurality of photovoltaic shingles includes a height H1 in a range of 10 mm to 17 mm. In another embodiment, each of the plurality of photovoltaic shingles includes a height H1 in a range of 11 mm to 17 mm. In another embodiment, each of the plurality of photovoltaic shingles includes a height H1 in a range of 12 mm to 17 mm. In another embodiment, each of the plurality of photovoltaic shingles includes a height H1 in a range of 13 mm to 17 mm. In another embodiment, each of the plurality of photovoltaic shingles includes a height H1 in a range of 14 mm to 17 mm. In another embodiment, each of the plurality of photovoltaic shingles includes a height H1 in a range of 15 mm to 17 mm. In another embodiment, each of the plurality of photovoltaic shingles includes a height H1 in a range of 16 mm to 17 mm.

In an embodiment, each of the plurality of photovoltaic shingles includes a height H1 in a range of 5 mm to 16 mm. In another embodiment, each of the plurality of photovoltaic shingles includes a height H1 in a range of 6 mm to 16 mm. In another embodiment, each of the plurality of photovoltaic shingles includes a height H1 in a range of 7 mm to 16 mm. In another embodiment, each of the plurality of photovoltaic shingles includes a height H1 in a range of 8 mm to 16 mm. In another embodiment, each of the plurality of photovoltaic shingles includes a height H1 in a range of 9 mm to 16 mm. In another embodiment, each of the plurality of photovoltaic shingles includes a height H1 in a range of 10 mm to 16 mm. In another embodiment, each of the plurality of photovoltaic shingles includes a height H1 in a range of 11 mm to 16 mm. In another embodiment, each of the plurality of photovoltaic shingles includes a height H1 in a range of 12 mm to 16 mm. In another embodiment, each of the plurality of photovoltaic shingles includes a height H1 in a range of 13 mm to 16 mm. In another embodiment, each of the plurality of photovoltaic shingles includes a height H1 in a range of 14 mm to 16 mm. In another embodiment, each of the plurality of photovoltaic shingles includes a height H1 in a range of 15 mm to 16 mm.

In an embodiment, each of the plurality of photovoltaic shingles includes a height H1 in a range of 5 mm to 15 mm. In another embodiment, each of the plurality of photovoltaic shingles includes a height H1 in a range of 6 mm to 15 mm. In another embodiment, each of the plurality of photovoltaic shingles includes a height H1 in a range of 7 mm to 15 mm. In another embodiment, each of the plurality of photovoltaic shingles includes a height H1 in a range of 8 mm to 15 mm. In another embodiment, each of the plurality of photovoltaic shingles includes a height H1 in a range of 9 mm to 15 mm. In another embodiment, each of the plurality of photovoltaic shingles includes a height H1 in a range of 10 mm to 15 mm. In another embodiment, each of the plurality of photovoltaic shingles includes a height H1 in a range of 11 mm to 15 mm. In another embodiment, each of the plurality of photovoltaic shingles includes a height H1 in a range of 12 mm to 15 mm. In another embodiment, each of the plurality of photovoltaic shingles includes a height H1 in a range of 13 mm to 15 mm. In another embodiment, each of the plurality of photovoltaic shingles includes a height H1 in a range of 14 mm to 15 mm.

In an embodiment, each of the plurality of photovoltaic shingles includes a height H1 in a range of 5 mm to 14 mm. In another embodiment, each of the plurality of photovoltaic shingles includes a height H1 in a range of 6 mm to 14 mm. In another embodiment, each of the plurality of photovoltaic shingles includes a height H1 in a range of 7 mm to 14 mm. In another embodiment, each of the plurality of photovoltaic shingles includes a height H1 in a range of 8 mm to 14 mm. In another embodiment, each of the plurality of photovoltaic shingles includes a height H1 in a range of 9 mm to 14 mm. In another embodiment, each of the plurality of photovoltaic shingles includes a height H1 in a range of 10 mm to 14 mm. In another embodiment, each of the plurality of photovoltaic shingles includes a height H1 in a range of 11 mm to 14 mm. In another embodiment, each of the plurality of photovoltaic shingles includes a height H1 in a range of 12 mm to 14 mm. In another embodiment, each of the plurality of photovoltaic shingles includes a height H1 in a range of 13 mm to 14 mm.

In an embodiment, each of the plurality of photovoltaic shingles includes a height H1 in a range of 5 mm to 13 mm. In another embodiment, each of the plurality of photovoltaic shingles includes a height H1 in a range of 6 mm to 13 mm. In another embodiment, each of the plurality of photovoltaic shingles includes a height H1 in a range of 7 mm to 13 mm. In another embodiment, each of the plurality of photovoltaic shingles includes a height H1 in a range of 8 mm to 13 mm. In another embodiment, each of the plurality of photovoltaic shingles includes a height H1 in a range of 9 mm to 13 mm. In another embodiment, each of the plurality of photovoltaic shingles includes a height H1 in a range of 10 mm to 13 mm. In another embodiment, each of the plurality of photovoltaic shingles includes a height H1 in a range of 11 mm to 13 mm. In another embodiment, each of the plurality of photovoltaic shingles includes a height H1 in a range of 12 mm to 13 mm.

In an embodiment, each of the plurality of photovoltaic shingles includes a height H1 in a range of 5 mm to 12 mm. In another embodiment, each of the plurality of photovoltaic shingles includes a height H1 in a range of 6 mm to 12 mm. In another embodiment, each of the plurality of photovoltaic shingles includes a height H1 in a range of 7 mm to 12 mm. In another embodiment, each of the plurality of photovoltaic shingles includes a height H1 in a range of 8 mm to 12 mm. In another embodiment, each of the plurality of photovoltaic shingles includes a height H1 in a range of 9 mm to 12 mm. In another embodiment, each of the plurality of photovoltaic shingles includes a height H1 in a range of 10 mm to 12 mm. In another embodiment, each of the plurality of photovoltaic shingles includes a height H1 in a range of 11 mm to 12 mm. In an embodiment, each of the plurality of photovoltaic shingles includes a height H1 in a range of 5 mm to 11 mm. In another embodiment, each of the plurality of photovoltaic shingles includes a height H1 in a range of 6 mm to 11 mm. In another embodiment, each of the plurality of photovoltaic shingles includes a height H1 in a range of 7 mm to 11 mm. In another embodiment, each of the plurality of photovoltaic shingles includes a height H1 in a range of 8 mm to 11 mm. In another embodiment, each of the plurality of photovoltaic shingles includes a height H1 in a range of 9 mm to 11 mm. In another embodiment, each of the plurality of photovoltaic shingles includes a height H1 in a range of 10 mm to 11 mm.

In an embodiment, each of the plurality of photovoltaic shingles includes a height H1 in a range of 5 mm to 10 mm. In another embodiment, each of the plurality of photovoltaic shingles includes a height H1 in a range of 6 mm to 10 mm. In another embodiment, each of the plurality of photovoltaic shingles includes a height H1 in a range of 7 mm to 10 mm. In another embodiment, each of the plurality of photovoltaic shingles includes a height H1 in a range of 8 mm to 10 mm. In another embodiment, each of the plurality of photovoltaic shingles includes a height H1 in a range of 9 mm to 10 mm.

In an embodiment, each of the plurality of photovoltaic shingles includes a height H1 in a range of 5 mm to 9 mm. In another embodiment, each of the plurality of photovoltaic shingles includes a height H1 in a range of 6 mm to 9 mm. In another embodiment, each of the plurality of photovoltaic shingles includes a height H1 in a range of 7 mm to 9 mm. In another embodiment, each of the plurality of photovoltaic shingles includes a height H1 in a range of 8 mm to 9 mm.

In an embodiment, each of the plurality of photovoltaic shingles includes a height H1 in a range of 5 mm to 8 mm. In another embodiment, each of the plurality of photovoltaic shingles includes a height H1 in a range of 6 mm to 8 mm. In another embodiment, each of the plurality of photovoltaic shingles includes a height H1 in a range of 7 mm to 8 mm.

In an embodiment, each of the plurality of photovoltaic shingles includes a height H1 in a range of 5 mm to 7 mm. In another embodiment, each of the plurality of photovoltaic shingles includes a height H1 in a range of 6 mm to 7 mm. In another embodiment, each of the plurality of photovoltaic shingles includes a height H1 in a range of 5 mm to 6 mm.

In an embodiment, each of the plurality of photovoltaic shingles includes a height H1 of 5 mm. In an embodiment, each of the plurality of photovoltaic shingles includes a height H1 of 6 mm. In an embodiment, each of the plurality of photovoltaic shingles includes a height H1 of 7 mm. In an embodiment, each of the plurality of photovoltaic shingles includes a height H1 of 8 mm. In an embodiment, each of the plurality of photovoltaic shingles includes a height H1 of 9 mm. In an embodiment, each of the plurality of photovoltaic shingles includes a height H1 of 10 mm. In an embodiment, each of the plurality of photovoltaic shingles includes a height H1 of 11 mm. In an embodiment, each of the plurality of photovoltaic shingles includes a height H1 of 12 mm. In an embodiment, each of the plurality of photovoltaic shingles includes a height H1 of 13 mm. In an embodiment, each of the plurality of photovoltaic shingles includes a height H1 of 14 mm. In an embodiment, each of the plurality of photovoltaic shingles includes a height H1 of 15 mm. In an embodiment, each of the plurality of photovoltaic shingles includes a height H1 of 16 mm. In an embodiment, each of the plurality of photovoltaic shingles includes a height H1 of 17 mm. In an embodiment, each of the plurality of photovoltaic shingles includes a height H1 of 18 mm. In an embodiment, each of the plurality of photovoltaic shingles includes a height H1 of 19 mm. In an embodiment, each of the plurality of photovoltaic shingles includes a height H1 of 20 mm.

Referring to FIGS. 3A through 5, in an embodiment, the system 5 includes at least one wireway 100 installed proximate to the plurality of photovoltaic shingles 10 on the roof deck 200. In an embodiment, the at least one wireway 100 is installed intermediate the plurality of photovoltaic shingles 10. In an embodiment, the at least one wireway 100 is installed proximate to each of the third ends 32 of the second layers 14. In an embodiment, the at least one wireway 100 overlays each of the first step flaps 54. In another embodiment, the at least one wireway 100 is installed proximate to each of the fourth ends 34 of the second layers 14. In an embodiment, the at least one wireway 100 overlays each of the second step flaps 56. In another embodiment, the at least one wireway 100 is installed intermediate each of the third ends 32 of a first plurality of the photovoltaic shingles 10 and the fourth ends 34 of a second plurality of the photovoltaic shingles 10. In an embodiment, the at least one wireway 100 overlays each of the first step flaps 54. In an embodiment, the at least one wireway 100 overlays each of the second step flaps 56. In another embodiment, the step flaps 54, 56 form the wireway 100.

Referring to FIGS. 6 through 11, in an embodiment, the at least one wireway 100 includes a pair of rails 102 spaced apart from one another. In an embodiment, the rails 102 extend outwardly from the roof deck 200. In an embodiment, the rails 102 are substantially parallel to another. In an embodiment, each of the rails 102 includes side flashing 104. In an embodiment, each of the side flashing 104 includes a first portion 106 positioned on the roof deck 200 and second portion 108 extending obliquely and inwardly in a first direction relative to the first portion 106. In an embodiment, slots 109 are formed between the first portions 106 and the second portions 108. In an embodiment, the at least one wireway 100 is rectangular in shape. In an embodiment, the photovoltaic shingles 10 overlay the second portion 108 of the side flashing 104. In an embodiment, the at least one wireway 100 is sized and shaped to receive electrical components of a photovoltaic system, such as an electrical junction box, electrical wire, and electrical connectors.

Still referring to FIGS. 6 through 11, in an embodiment, the at least one wireway 100 includes a lid 110. In an embodiment, the lid 110 is removably attached to the at least one wireway 100. In an embodiment, the lid 110 includes a cover portion 112 and a pair of rails 114 spaced apart from one another and extending obliquely and inwardly in a second direction opposite the first direction of the second portion 108 of the rails 102. In an embodiment, the lid 110 is removably engaged with the side flashing 104 of the wireway 100 such that the rails 114 of the lid 110 engage (e.g., snap-in) the second portions 108 of the side flashing 104. In an embodiment, the lid 110 is substantially rectangular in shape. In another embodiment, the rails 114 extend outwardly and obliquely in the first direction. In other embodiments, the lid 110 is removably attached to the at least one wireway 100 by screws, nails, rivets, adhesives or other fasteners.

In an embodiment, the at least one wireway 100 includes a plurality of wireways 100. In an embodiment, one of the lids 110 of one of the plurality of wireways 100 overlaps another of the lids 110 of another of the plurality of wireways 100 (see FIGS. 9 through 11). In an embodiment, the overlapping lids 110 promote water shedding. In an embodiment, the at least one wireway 100 is moisture resistant. As used herein, the term "moisture resistant" means having a water transmission rate of less than or equal to 0.05 U.S. perms, as measured by ASTM E 96, Procedure B—Standard Test Methods for Water Vapor Transmission of Materials. In an embodiment, the wireway 100 withstands walking loads/step resistance that conforms to standards under UL 3741 test standards (UL Standard for Safety Photovoltaic Hazard Control). In an embodiment, the wireway 100 includes an axe impact resistance that conforms to standards under UL 3741 test standards. In an embodiment, the wireway 100 includes a body fall resistance that conforms to standards under UL 3741 test standards.

Figure 12C:
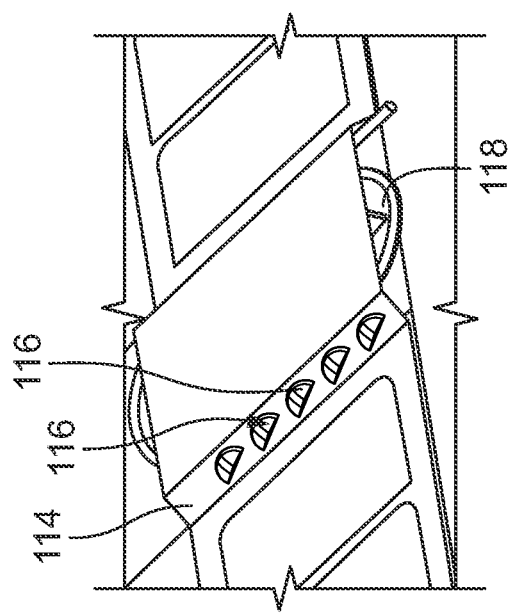
FIGS. 12A through 12D are top perspective views of embodiments of a wireway cover.
Figure 12D:
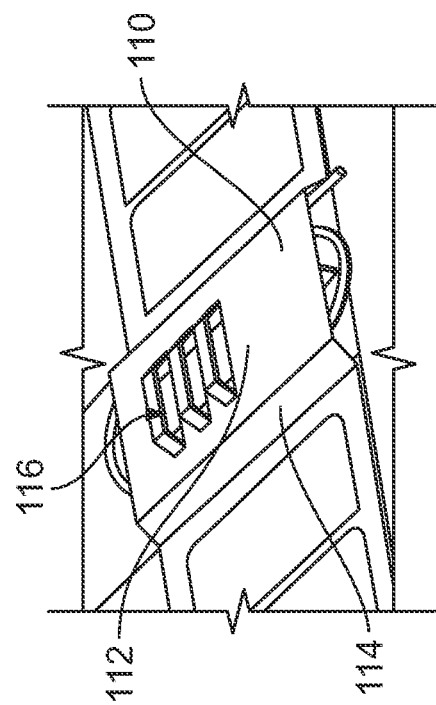

In certain embodiments, the lid 110 includes a plurality of louvers 116. See FIGS. 12C and 12D. In an embodiment, the louvers 116 are formed within the rails 114 of the lid 110. In another embodiment, the louvers 116 are formed within the cover portion 112. In an embodiment, the louvers 116 are elongated. In another embodiment, the louvers 116 are rectangular in shape. In another embodiment, the louvers 116 are semi-circular in shape.

Figure 12A:
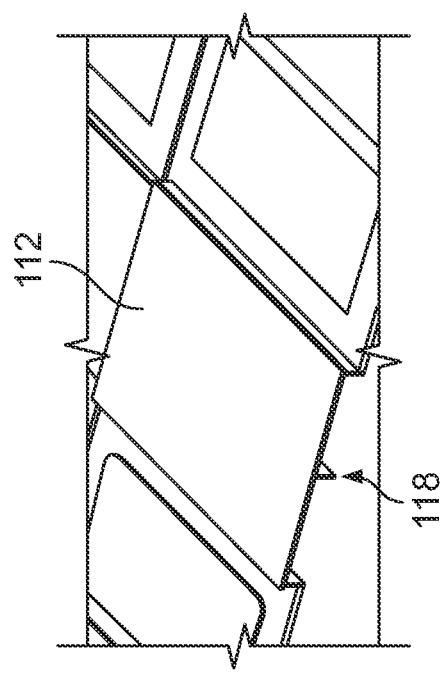
Figure 12B:
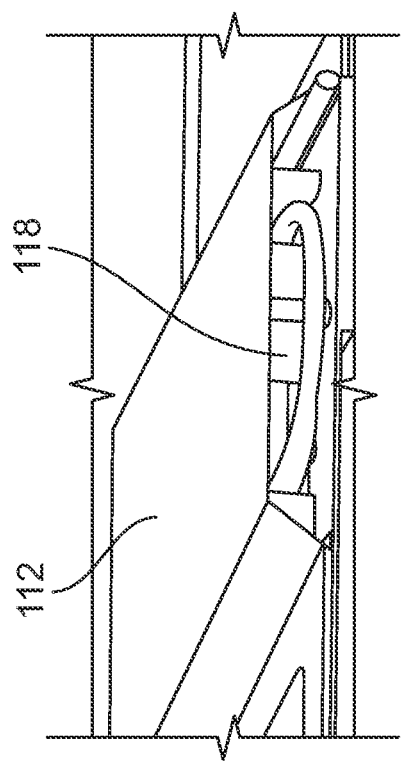
Figure 13A:
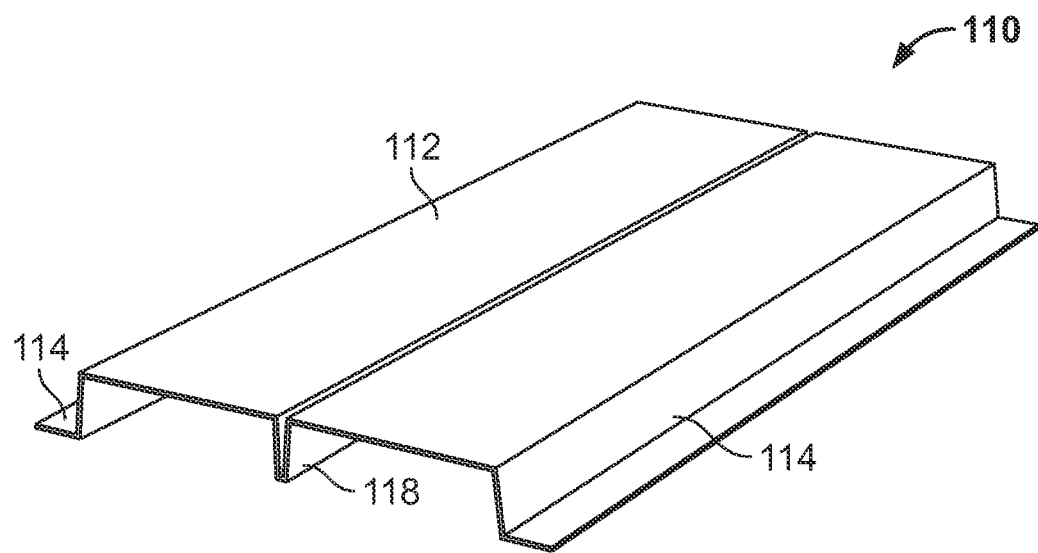
FIGS. 13A and 13B are top perspective views of embodiments of covers for wireways.
Figure 13B:
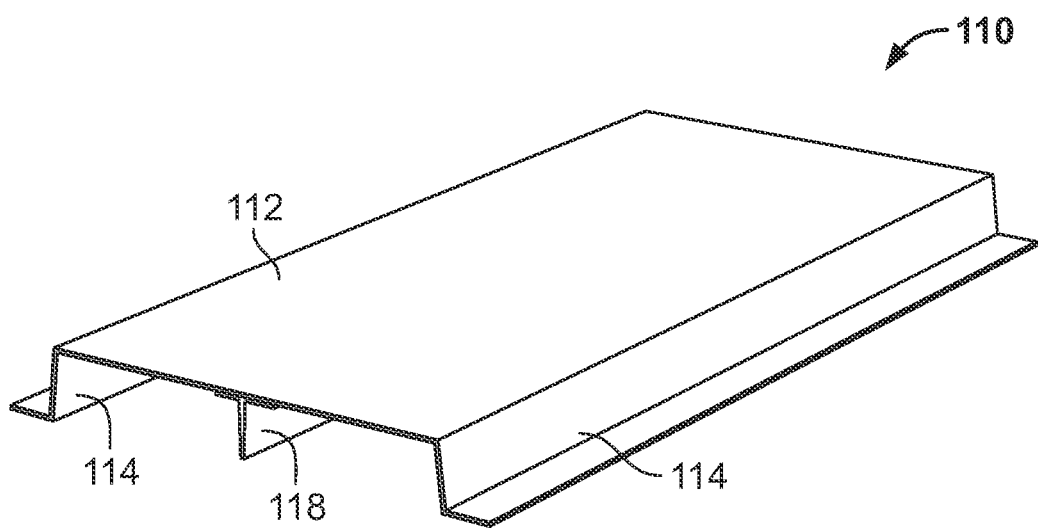

In an embodiment, the lid 110 includes at least one support member 118 extending from an interior surface 120 of the cover portion 112. In an embodiment, the at least one support member 118 includes a plurality of support members. In an embodiment, each of the plurality of support members 118 is spaced apart from one another. In an embodiment, each of the plurality of support members 118 is oriented in at least two opposing rows (see FIGS. 10 and 11). In an embodiment, the at least one support member 118 is integral with the cover portion 112. In an embodiment, the at least one support member 118 is formed by crimping a section of the cover portion 112 (see FIGS. 12A and 13A). In another embodiment, the at least one support member 118 is attached to the interior surface 120 of the cover portion 112 (see FIGS. 12B and 13B). In an embodiment, the at least one support member 118 is attached to the interior surface 120 of the cover portion 112 by welding. In an embodiment, the at least one support member 118 is attached to the interior surface 120 of the cover portion 112 by an adhesive. In an embodiment, the at least one support member 118 includes a T-rail shape.

Figure 14A:
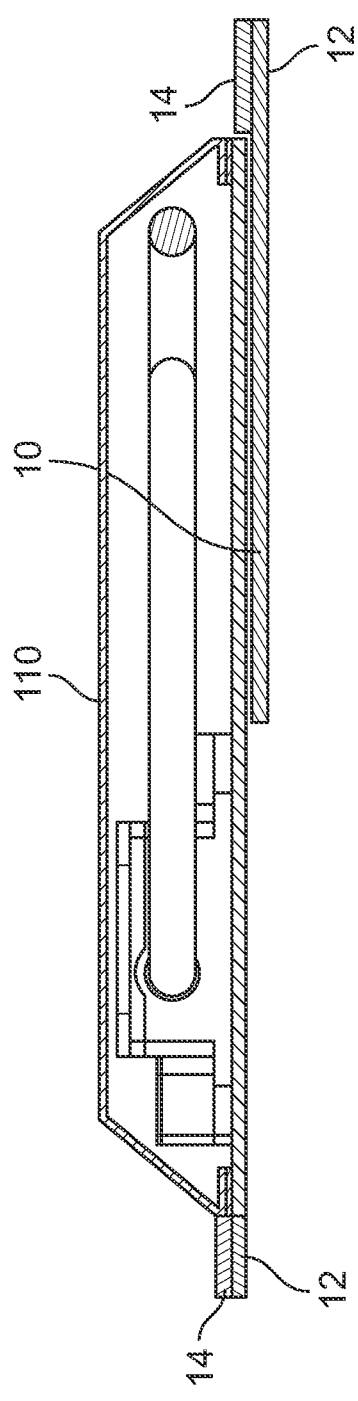
FIGS. 14A through 14E illustrate embodiments of photovoltaic shingles and associated wireways and covers.
Figure 14C:
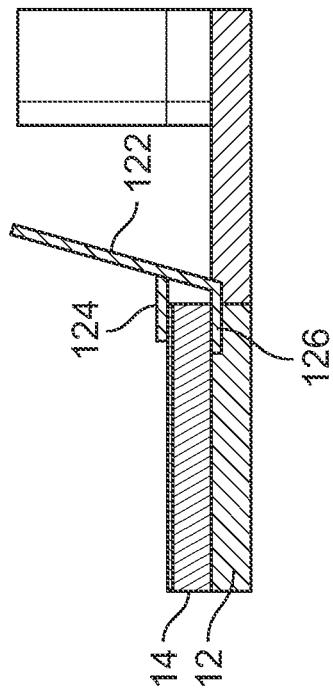
Figure 14B:
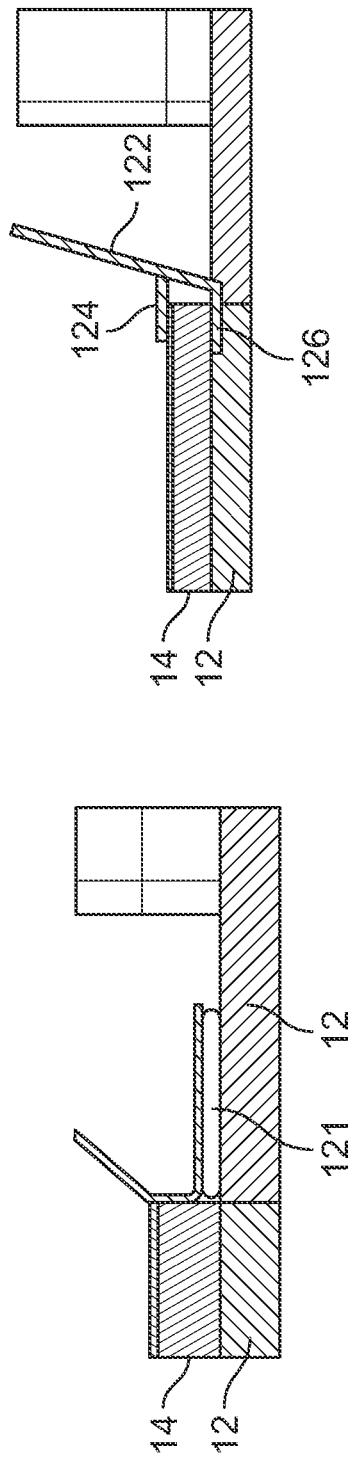

Referring to FIGS. 14A through 14C, in other embodiments, the lid 110 is attached to the first layer 12 of one of the plurality of shingles 10 by an adhesive 121. In another embodiment, the lid 110 includes a hook member 122. In an embodiment, the hook member 122 includes an upper rail 124 and a lower rail 126 spaced apart from and substantially parallel to the upper rail 124. In an embodiment, the hook member 122 is removably positioned intermediate the first layer 12 of one of the plurality of photovoltaic shingles 10 and the second layer 14 of the one of the plurality of photovoltaic shingles 10 such that the second layer 14 is positioned between the upper and lower rails 124, 126.

Figure 14D:
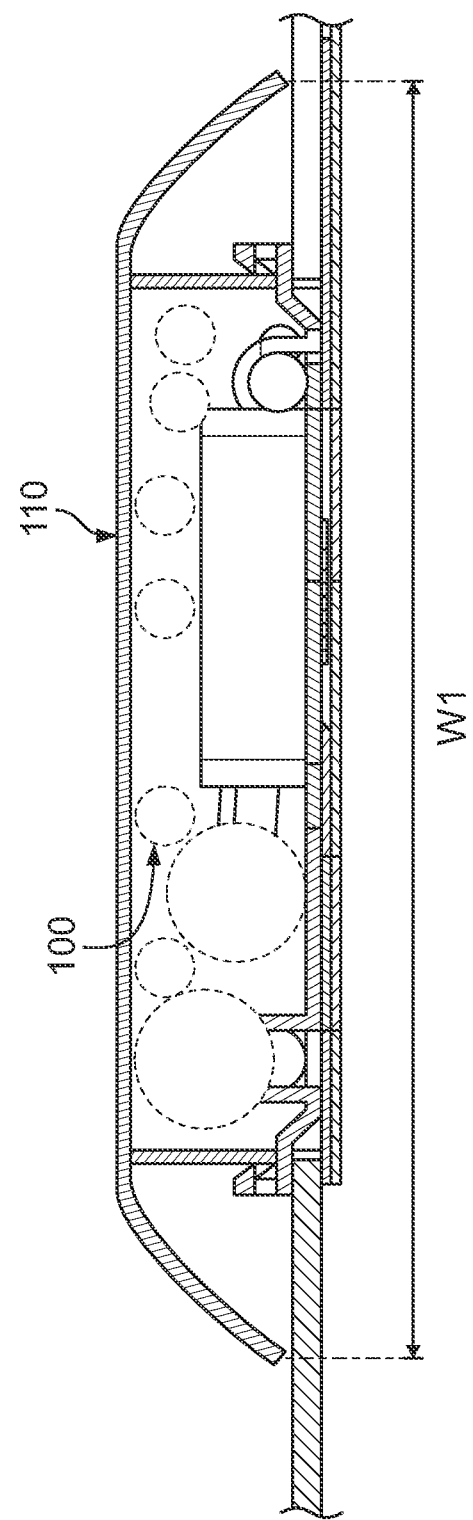
Figure 14E:
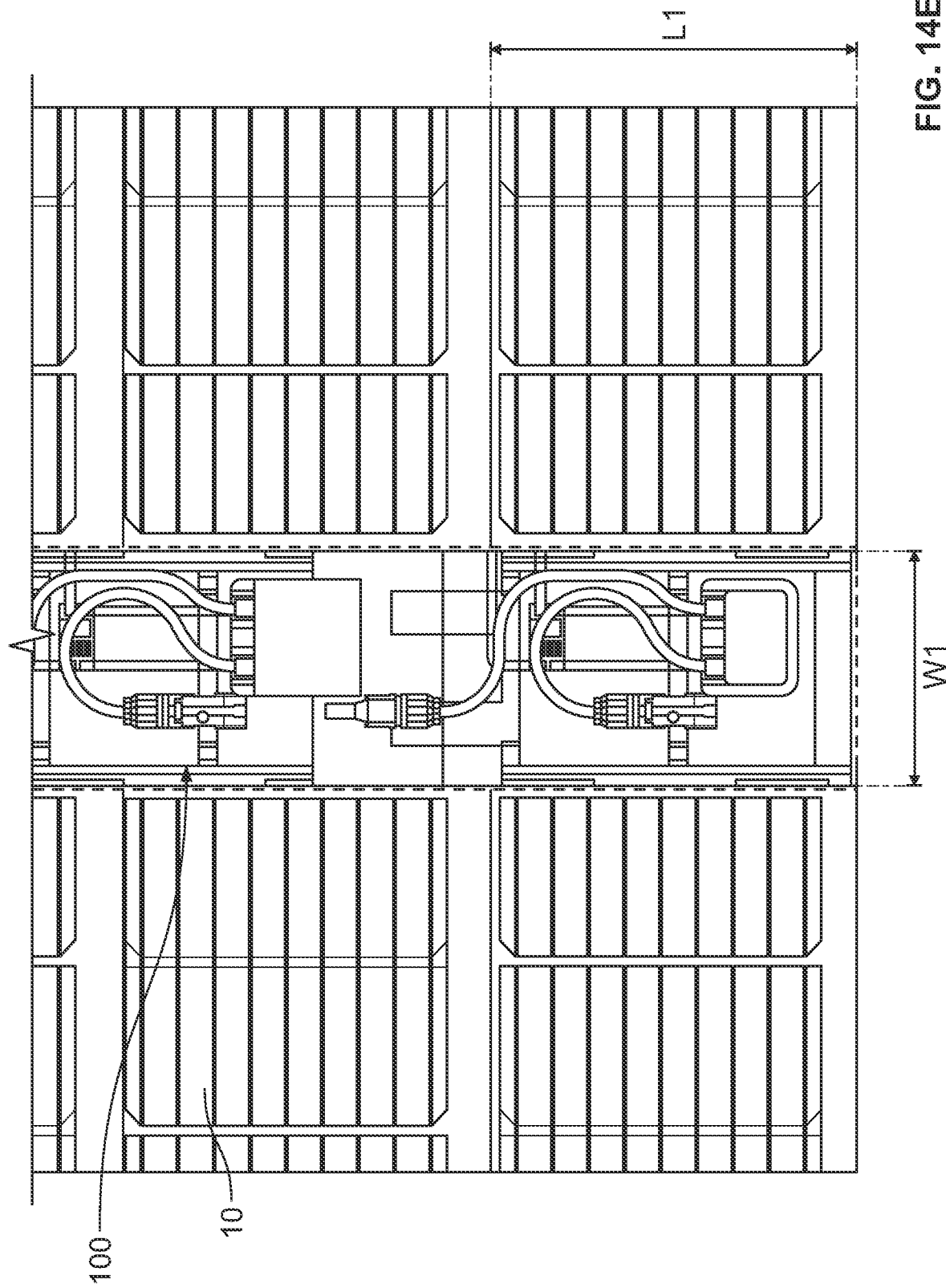

Referring to FIGS. 14D and 14E, in an embodiment, the wireway 100 includes a length L1 of 100 mm to 450 mm. In another embodiment, the wireway 100 includes a length L1 of 100 mm to 400 mm. In another embodiment, the wireway 100 includes a length L1 of 100 mm to 350 mm. In another embodiment, the wireway 100 includes a length L1 of 100 mm to 300 mm. In another embodiment, the wireway 100 includes a length L1 of 100 mm to 250 mm. In another embodiment, the wireway 100 includes a length L1 of 100 mm to 200 mm. In another embodiment, the wireway 100 includes a length L1 of 100 mm to 150 mm.

In an embodiment, the wireway 100 includes a length L1 of 150 mm to 450 mm. In another embodiment, the wireway 100 includes a length L1 of 150 mm to 400 mm. In another embodiment, the wireway 100 includes a length L1 of 150 mm to 350 mm. In another embodiment, the wireway 100 includes a length L1 of 150 mm to 300 mm. In another embodiment, the wireway 100 includes a length L1 of 150 mm to 250 mm. In another embodiment, the wireway 100 includes a length L1 of 150 mm to 200 mm.

In an embodiment, the wireway 100 includes a length L1 of 200 mm to 450 mm. In another embodiment, the wireway 100 includes a length L1 of 200 mm to 400 mm. In another embodiment, the wireway 100 includes a length L1 of 200 mm to 350 mm. In another embodiment, the wireway 100 includes a length L1 of 200 mm to 300 mm. In another embodiment, the wireway 100 includes a length L1 of 200 mm to 250 mm.

In an embodiment, the wireway 100 includes a length L1 of 250 mm to 450 mm. In another embodiment, the wireway 100 includes a length L1 of 250 mm to 400 mm. In another embodiment, the wireway 100 includes a length L1 of 250 mm to 350 mm. In another embodiment, the wireway 100 includes a length L1 of 250 mm to 300 mm.

In an embodiment, the wireway 100 includes a length L1 of 300 mm to 450 mm. In another embodiment, the wireway 100 includes a length L1 of 300 mm to 400 mm. In another embodiment, the wireway 100 includes a length L1 of 300 mm to 350 mm. In an embodiment, the wireway 100 includes a length L1 of 350 mm to 450 mm. In another embodiment, the wireway 100 includes a length L1 of 350 mm to 400 mm. In another embodiment, the wireway 100 includes a length L1 of 400 mm to 450 mm.

In an embodiment, the wireway 100 includes a width W1 of 100 mm to 200 mm. In another embodiment, the wireway 100 includes a width W1 of 100 mm to 175 mm. In another embodiment, the wireway 100 includes a width W1 of 100 mm to 150 mm. In another embodiment, the wireway 100 includes a width W1 of 100 mm to 125 mm.

In an embodiment, the wireway 100 includes a width W1 of 125 mm to 200 mm. In another embodiment, the wireway 100 includes a width W1 of 125 mm to 175 mm. In another embodiment, the wireway 100 includes a width W1 of 125 mm to 150 mm. In an embodiment, the wireway 100 includes a width W1 of 150 mm to 200 mm. In another embodiment, the wireway 100 includes a width W1 of 150 mm to 175 mm. In an embodiment, the wireway 100 includes a width W1 of 175 mm to 200 mm.

In an embodiment, the wireway 100 includes a height H1 of 5 mm to 25 mm. In another embodiment, the wireway 100 includes a height H1 of 5 mm to 20 mm. In another embodiment, the wireway 100 includes a height H1 of 5 mm to 15 mm. In another embodiment, the wireway 100 includes a height H1 of 5 mm to 10 mm.

In an embodiment, the wireway 100 includes a height H1 of 10 mm to 25 mm. In another embodiment, the wireway 100 includes a height H1 of 10 mm to 20 mm. In another embodiment, the wireway 100 includes a height H1 of 10 mm to 15 mm. In another embodiment, the wireway 100 includes a height H1 of 15 mm to 25 mm. In another embodiment, the wireway 100 includes a height H1 of 15 mm to 20 mm. In an embodiment, the wireway 100 includes a height H1 of 20 mm to 25 mm.

In an embodiment, the wireway 100 is made from a polymeric material. In an embodiment, the wireway 100 is made from polypropylene. In another embodiment, the wireway 100 is made from polyethylene. In another embodiment, the wireway 100 is made from polyethylene. In another embodiment, the wireway 100 is made from metal. In an embodiment, the wireway 100 is made from aluminum.

In an embodiment, the wireway 100 includes a fire resistance that conforms to standards under UL 94 test standards. In an embodiment, the wireway 100 includes a fire-resistance having a V-0 rating in accordance with the standards of UL 94 test standards. In another embodiment, the wireway 100 includes a fire-resistance having a V-1 rating in accordance with the standards of UL 94 test standards. In another embodiment, the wireway 100 includes a fire-resistance having a V-2 rating in accordance with the standards of UL 94 test standards. In an embodiment, the photovoltaic shingle 10 is a component of a roofing/photovoltaic system that conforms to standards under UL 790/ASTM E 108 test standards. In an embodiment, the roofing/photovoltaic system includes a fire-resistance having a Class A rating in accordance with the standards of UL 790/ASTM E 108 test standards.

Figure 15C:
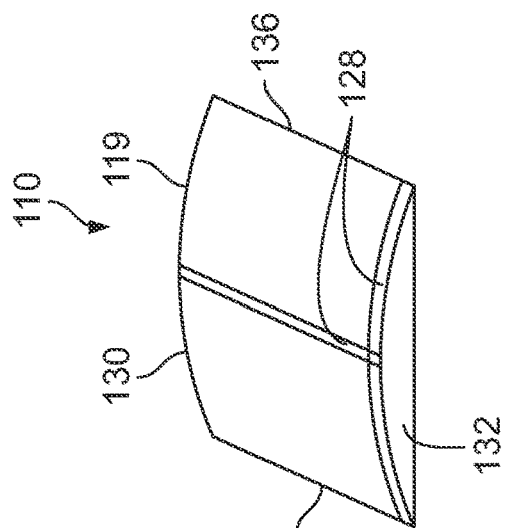
FIGS. 15A through 15C are top perspective views of embodiments of wireway covers including markings.
Figure 15B:
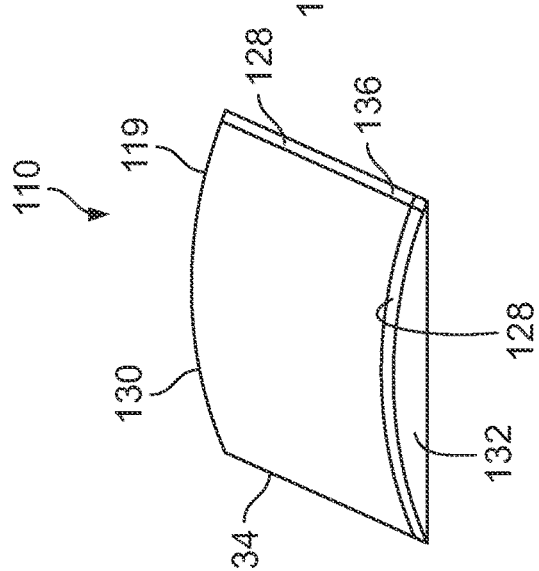
Figure 15A:
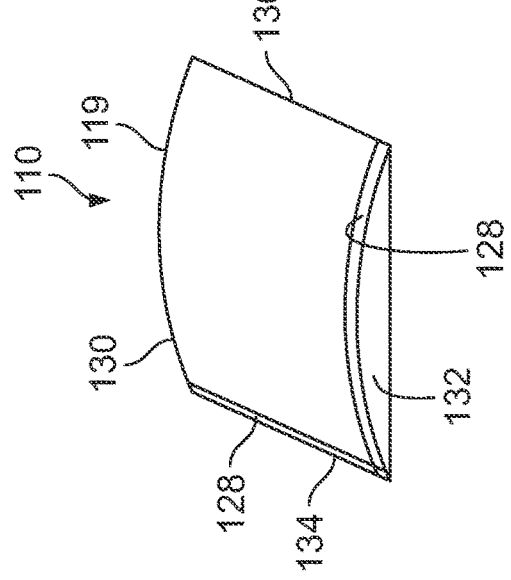
Figure 16:
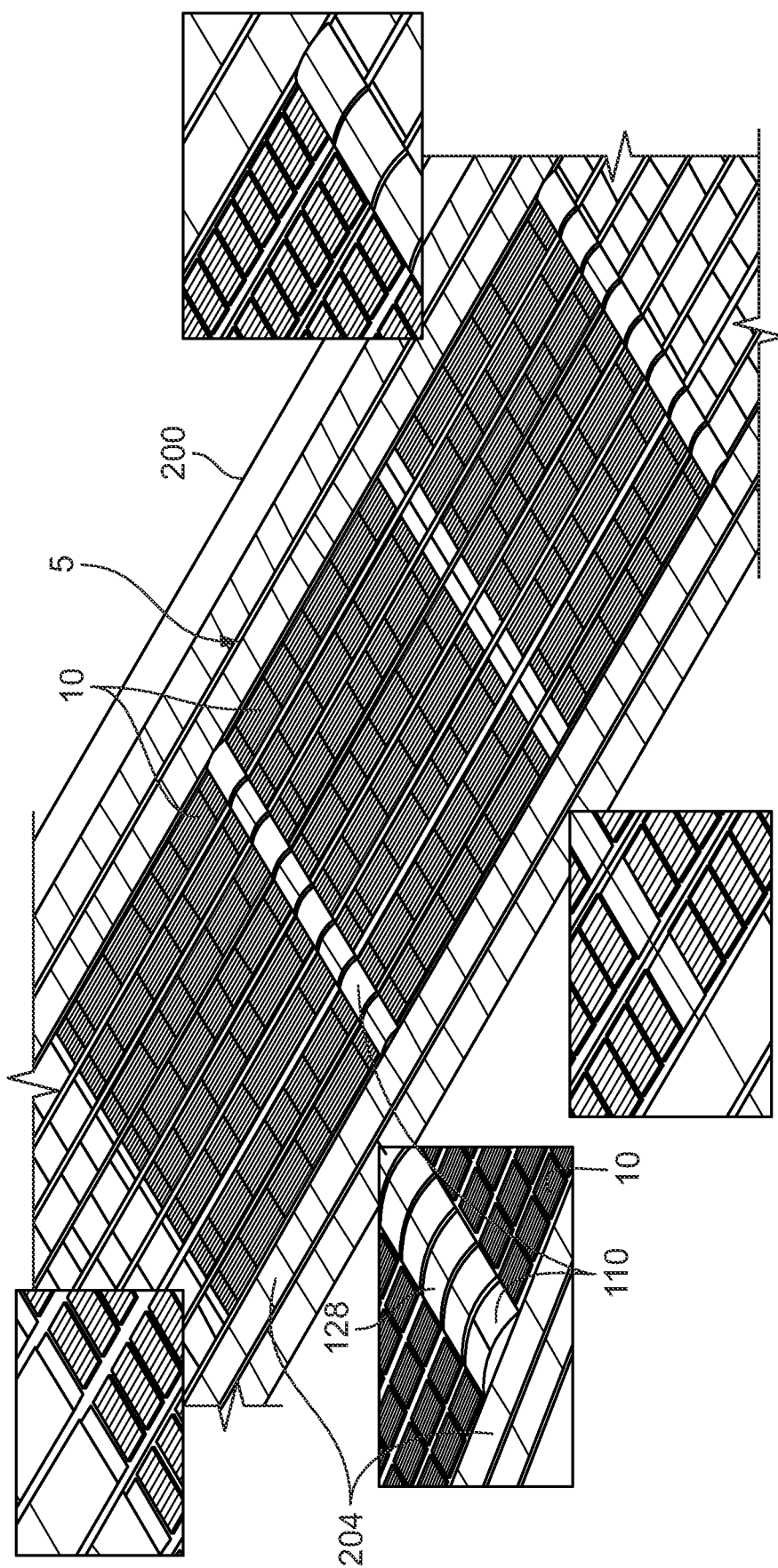
FIG. 16 is a top perspective view of an embodiment of a roofing system with photovoltaic shingles and the wireway covers of FIGS. 15A through 15C.
Figure 17A:
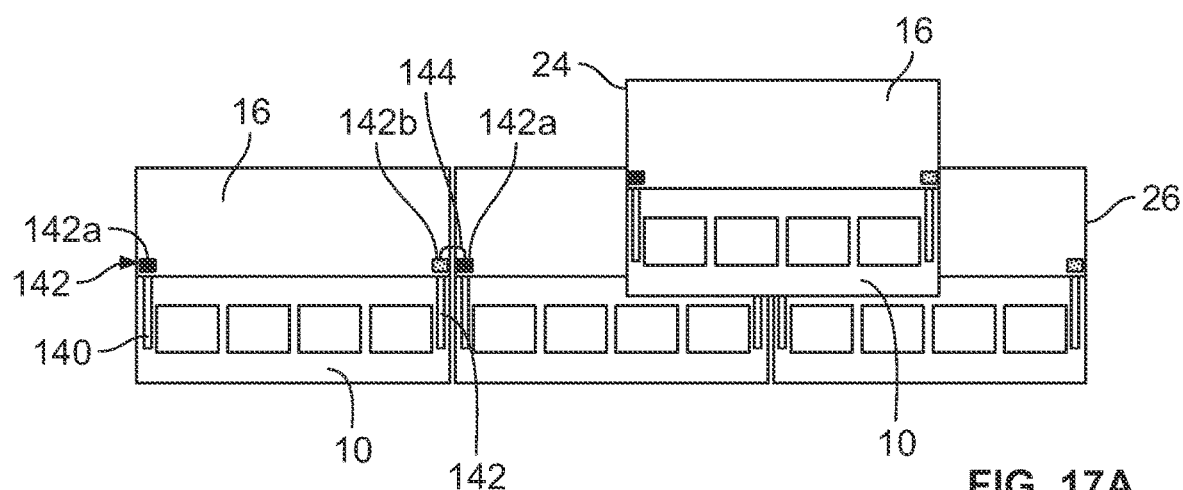
FIGS. 17A and 17B are a top plan view and side cross-sectional view, respectively, of another embodiment of a system of photovoltaic shingles with electrical connectors.
Figure 17B:
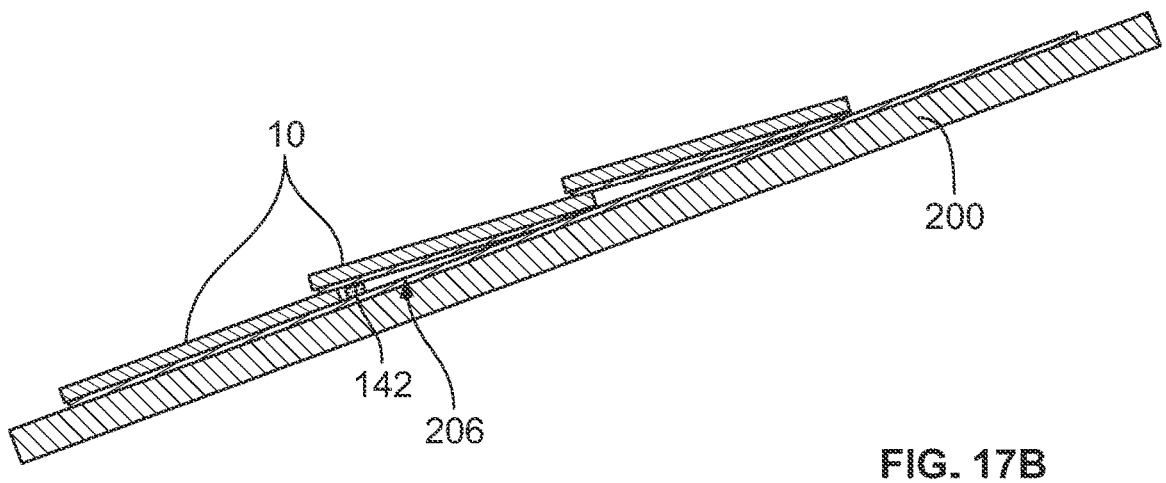
Figure 18A:
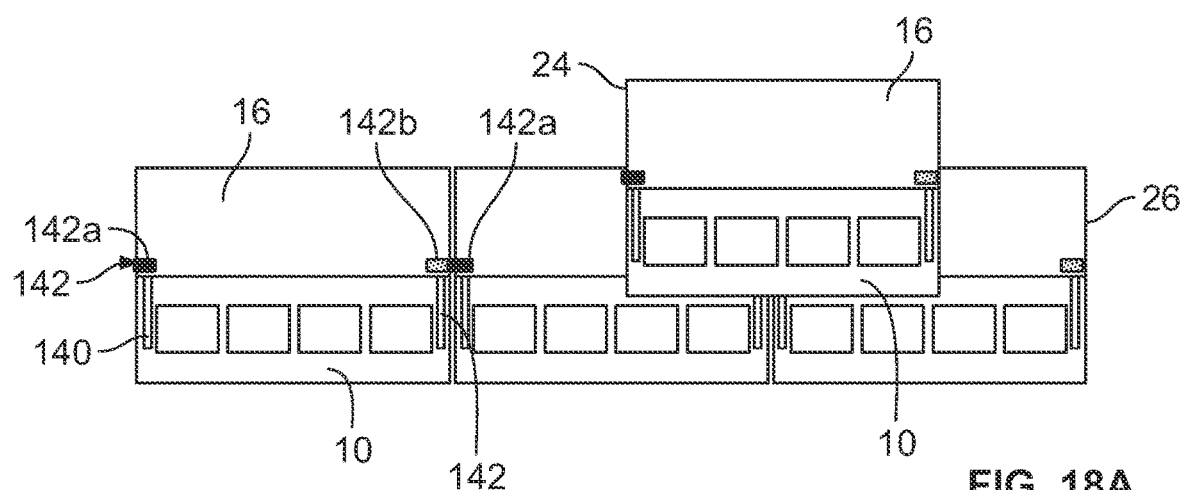
FIGS. 18A and 18B are a top plan view and side cross-sectional view, respectively, of another embodiment of a system of photovoltaic shingles with USB connectors.
Figure 18B:
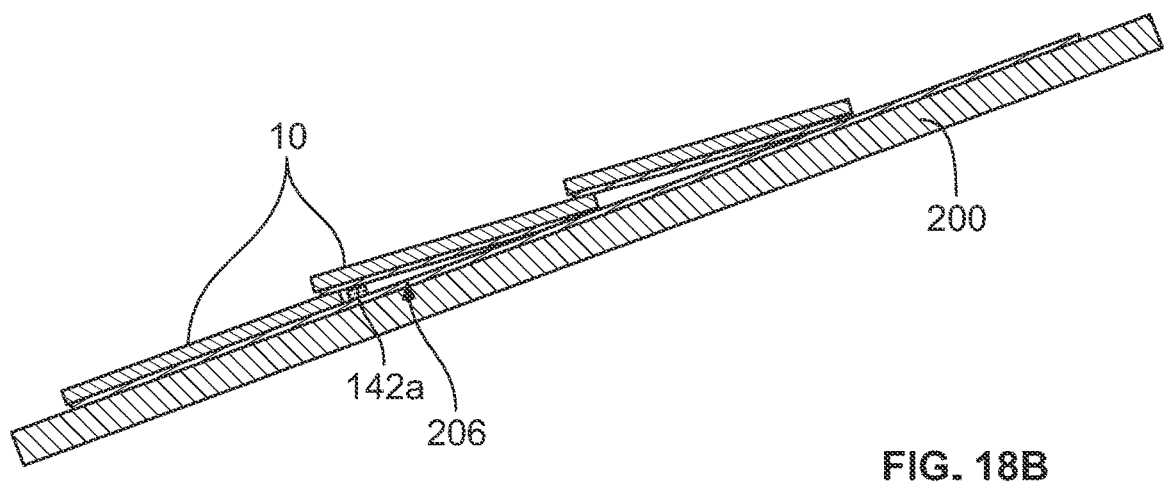

Referring to FIGS. 15A through 16, in an embodiment, the outer surface 119 of the cover portion 112 of the lid 110 includes at least one band 128. In an embodiment, the at least one band 128 includes a first color. In an embodiment, the first color is different from a color of a remainder of the outer surface 119. In an embodiment, the lid 110 includes a first end 130, a second end 132 opposite the first end 130, a third end 134 extending from the first end 130 to the second end 132, and a fourth end 136 extending from the first end 130 to the second end 132.

In an embodiment, one of the at least one band 128 extends from the first end 130 to the second end 132. In an embodiment, the one of the at least one band 128 is proximate to the third end 134. See FIG. 15A. In an embodiment, the one of the at least one band 128 is proximate to the fourth end 136. See FIG. 15B. In an embodiment, the one of the at least one band 128 is intermediate the third end 134 and the fourth end 136. See FIG. 15C. In an embodiment, one of the at least one band 128 extends from the third end 134 to the fourth end 136. In an embodiment, the one of the at least one band 128 is proximate to the first end 130. In an embodiment, the one of the at least one band 128 is proximate to the second end 132. In an embodiment, the at least one band 128 includes a second band 128, wherein the second band 128 extends from the first end 130 to the second end 132. In an embodiment, the second band 128 is proximate to the third end 134. In an embodiment, the second band 128 is proximate to the fourth end 136. In an embodiment, the second band 128 is intermediate the third end 134 and the fourth end 136. In an embodiment, the bands 128 mimic the appearance of the photovoltaic shingles 10 to provide a blended aesthetic look between the lids 110, the photovoltaic shingles 10, and a plurality of roofing shingles 204 of the roofing system 5 (see FIG. 16).

Referring to FIGS. 17A through 18B, in an embodiment, the at least one solar cell 18 includes an electrical bussing 140 and at least one electrical connector 142 electrically connected to the electrical bussing 140. In an embodiment, the at least one electrical connector 142 is positioned on the head lap 16. In an embodiment, the at least one electrical connector 142 includes a first electrical connector 142a and a second electrical connector 142b. In an embodiment, the first electrical connector 142a is positioned proximate to the third end 24 and the second electrical connector 142b is positioned proximate to the fourth end 26. In an embodiment, the first electrical connector 142a of one of the plurality of photovoltaic shingles 10 is connected to the second electrical connector 142*b* of another of the plurality of photovoltaic shingles 10. In an embodiment, the first electrical connector 142*a* is a male connector and the second electrical connector 142*b* is a female connector. In an embodiment, the first and second electrical connectors 142*a*, 142*b* are connected to one another by an electrical wire 144 (see FIGS. 17A and 17B). In an embodiment, the first and second electrical connectors 142*a*, 142*b* are removably connected to one another. In an embodiment, the first and second electrical connectors 142*a*, 142*b* are USB connectors (see FIGS. 18A and 18B). In an embodiment, when the photovoltaic shingles 10 are installed to the roof deck 200, each of the electrical connectors 142 are positioned within a corresponding space 206 formed between one of the photovoltaic shingles 10 and another overlapping one of the photovoltaic shingles 10.

Figure 19:
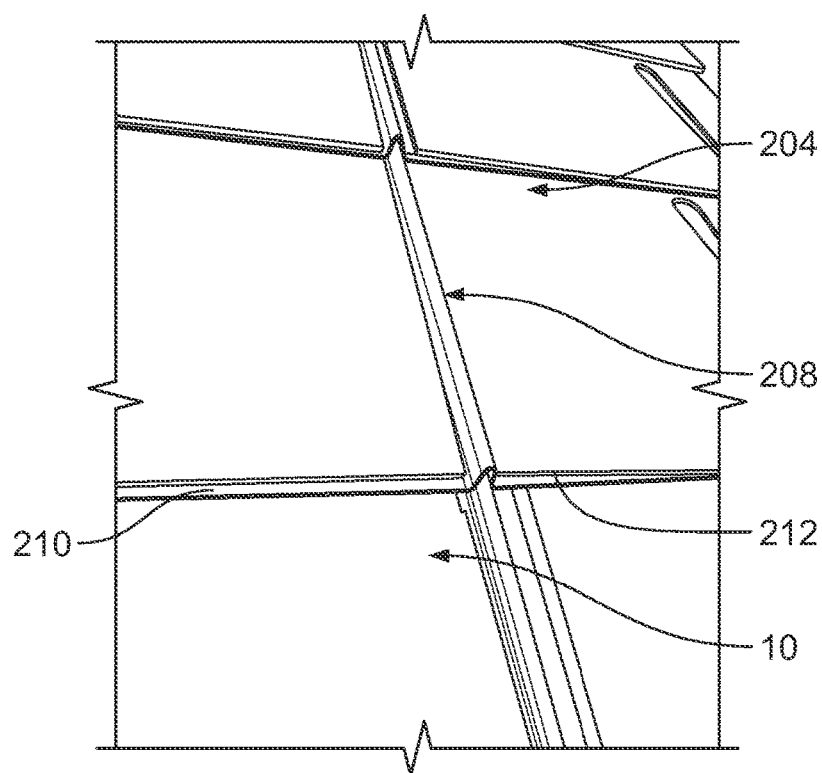
FIG. 19 is a system of photovoltaic shingles having step flashing.
Figure 20:
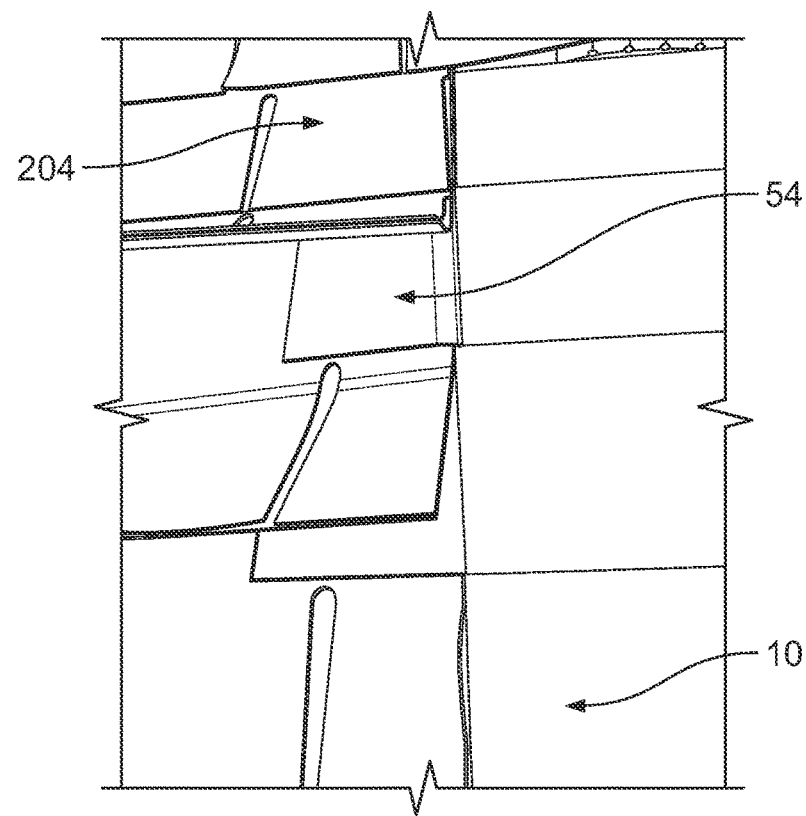
FIGS. 20, 21A and 21B are embodiments of systems of photovoltaic shingles having integrated step flaps.
Figure 21A:
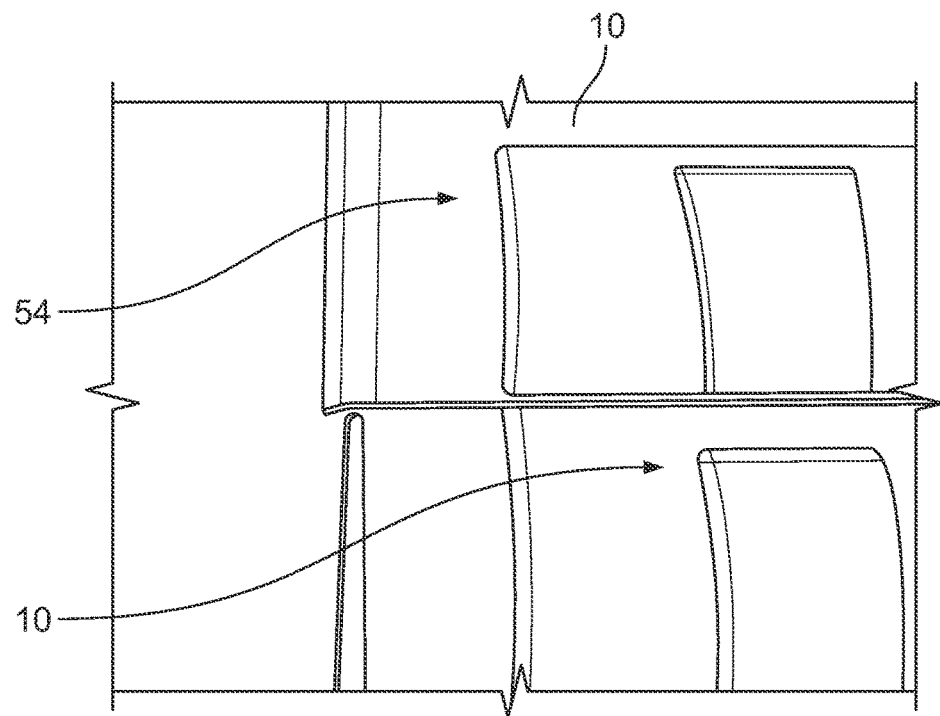
Figure 21B:
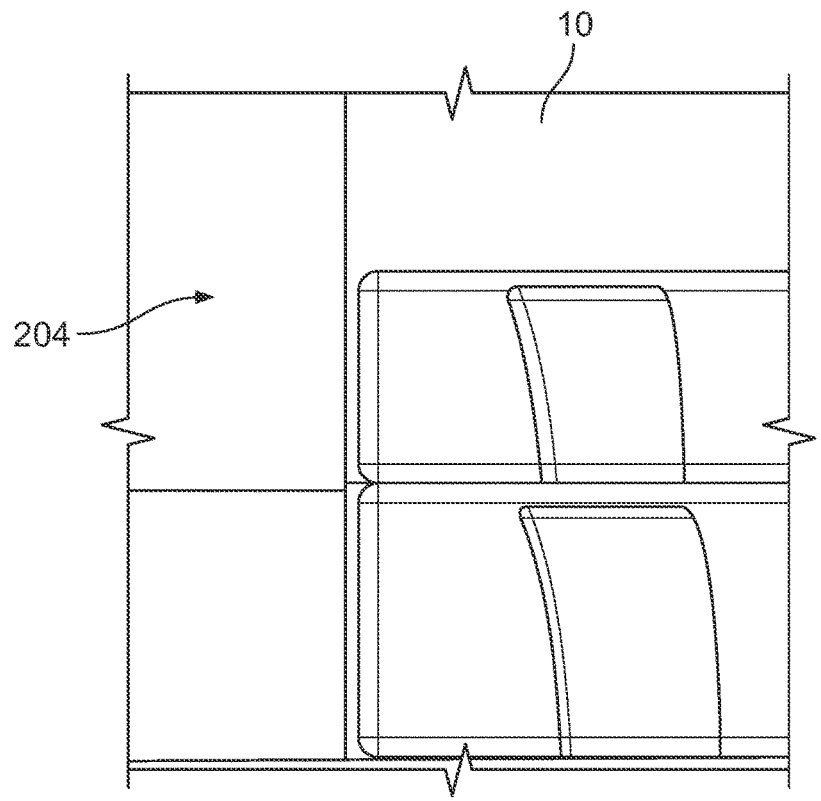
Figure 22B:
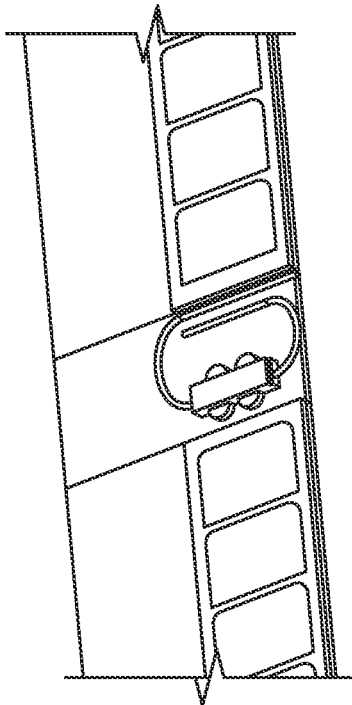
FIGS. 22A through 22D are schematic views of an embodiment of a method of installing a photovoltaic system.
Figure 22D:
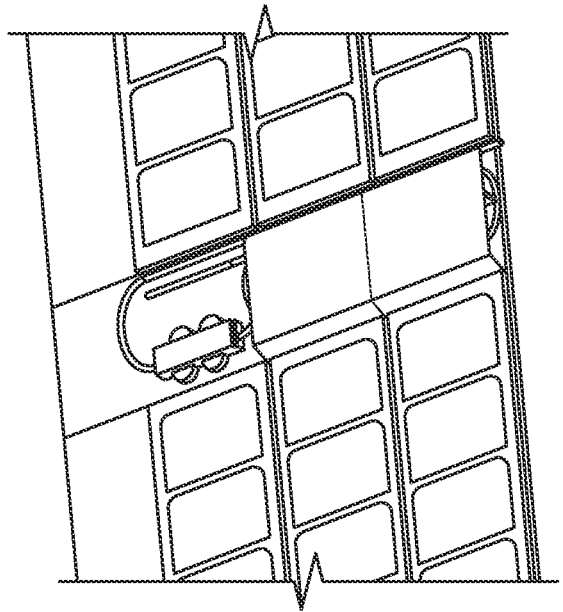
Figure 22A:
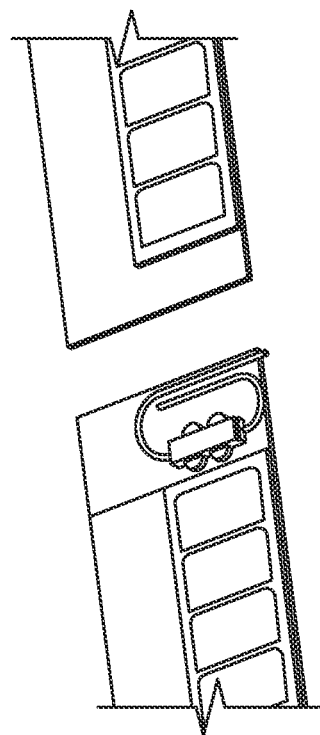
Figure 22C:
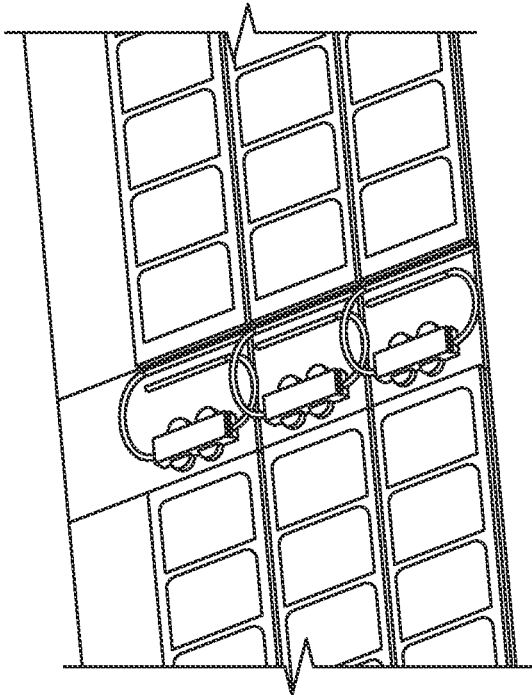
Figure 23B:
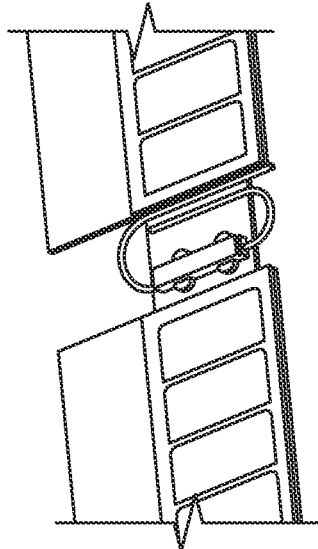
FIGS. 23A through 23D are schematic views of an embodiment of a method of installing a photovoltaic system.
Figure 23D:
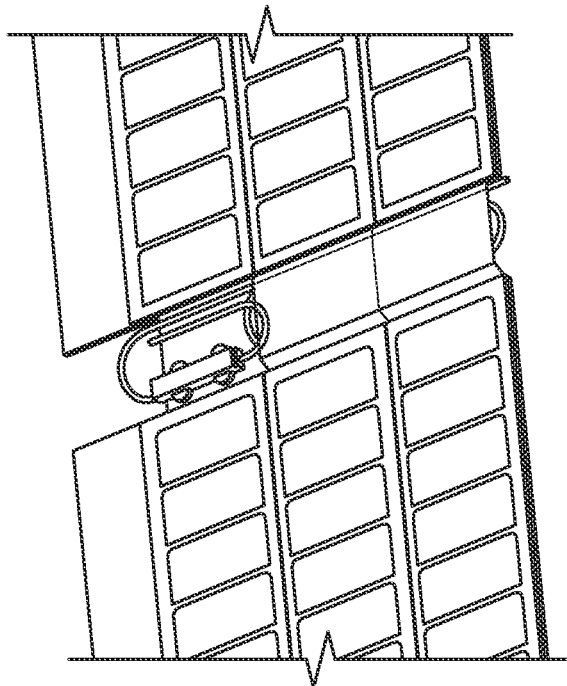
Figure 23A:
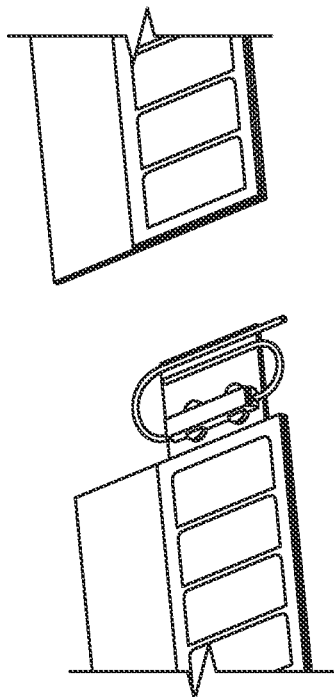
Figure 23C:
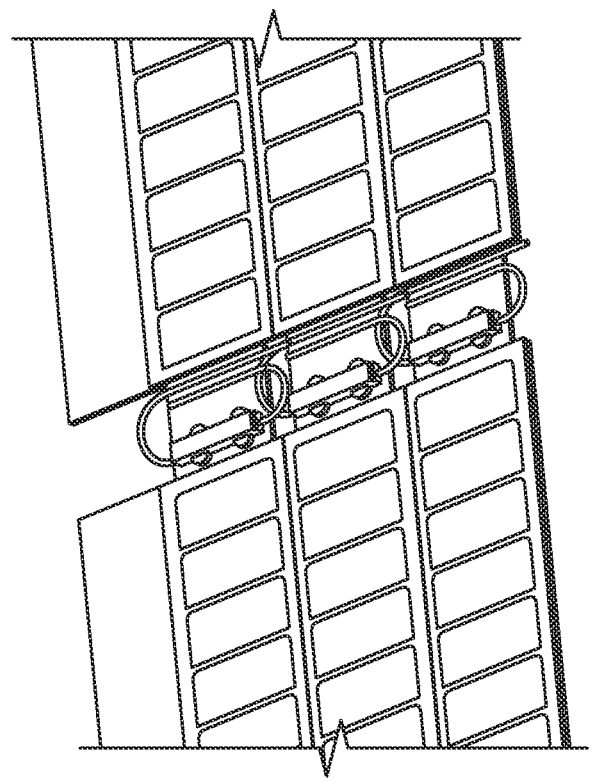

Referring to FIG. 19, in an embodiment, the system 5 includes step flashing 208 installed on the roof deck 200. In an embodiment, the step flashing 208 includes a first portion 210 and a second portion 212. In an embodiment, the photovoltaic shingle 10 overlays the first portion 210, while one of the roofing shingles 204 overlays the second portion 212. In an embodiment, the roofing shingles 204 include asphalt shingles. Referring to FIGS. 20, 21A and 21B, in another embodiment, the one of the roofing shingles 204 overlays one of the step flaps 54, 56 of a corresponding one of the photovoltaic shingles 10. In an embodiment, the plurality of photovoltaic shingles 10 is coplanar with the plurality of roofing shingles 204. As used herein, the term "coplanar" means the plurality of photovoltaic shingles 10 and the plurality of roofing shingles 204 are positioned and extend within the same plane, or the plurality of photovoltaic shingles 10 is positioned and extends in a first plane, and the plurality of roofing shingles 204 is positioned and extends within a second plane that is offset from the first plane of a relatively of no more than ten percent of a height measured from the roof deck to an upper surface of the plurality of photovoltaic shingles.

In an embodiment, a method of installing a photovoltaic system includes the following steps:
obtaining a first photovoltaic shingle and a second photovoltaic shingle, each of which includes a first layer, and a second layer overlaying the first layer, wherein the first layer includes a head lap, wherein the second layer includes at least one solar cell;
installing the first photovoltaic shingle on a roof deck; and
overlaying the second photovoltaic shingle on at least the head lap of the first photovoltaic shingle.

In an embodiment, the method of installing the photovoltaic system may include the step of installing a wireway proximate to the plurality of photovoltaic shingles. In an embodiment, the method of installing the photovoltaic system may include the step of installing at least one electrical junction box installed within the at least one wireway. In an embodiment, the method of installing the photovoltaic system may include the step of installing at least one lid on the at least one wireway.

Referring to FIGS. 22A through 22D, in another embodiment, a method of installing a photovoltaic system includes the following steps:
obtaining a first photovoltaic shingle, a second photovoltaic shingle, a third photovoltaic shingle, and fourth photovoltaic shingle, each of which includes a first layer, and a second layer overlaying the first layer, wherein the first layer includes a head lap and a step flap, wherein the second layer includes at least one solar cell;
installing a junction box on the step flap of the first photovoltaic shingle;
installing the second photovoltaic shingle on a roof deck;
installing the first photovoltaic shingle on the roof deck by overlaying the step flap of the second photovoltaic shingle with the step flap of the first photovoltaic shingle;
installing a junction box on the step flap of the third photovoltaic shingle;
installing the fourth photovoltaic shingle on the roof deck by overlaying the fourth photovoltaic shingle on at least the head lap of the second photovoltaic shingle;
installing the third photovoltaic shingle on the roof deck by overlaying the step flap of the third photovoltaic shingle with the step flap of the fourth photovoltaic shingle and overlaying the third photovoltaic shingle on at least the head lap of the first photovoltaic shingle.

In an embodiment, the method of installing the photovoltaic system may include the step of covering each of the step flaps and junction boxes with a corresponding lid.

Referring to FIGS. 23A through 23D, in another embodiment, a method of installing a photovoltaic system includes the following steps:
obtaining a first photovoltaic shingle, a second photovoltaic shingle, a third photovoltaic shingle, and a fourth photovoltaic shingle, each of which includes a first layer, and a second layer overlaying the first layer, wherein the first layer includes a head lap, wherein the second layer includes at least one solar cell, and wherein each of the first photovoltaic shingle and the third photovoltaic shingle includes a wireway located at a first end thereof;
installing a junction box on each of the corresponding wireways of the first and third photovoltaic shingles;
installing the first photovoltaic shingle on a roof deck;
installing the second photovoltaic shingle on the roof deck such that a first end of the second photovoltaic shingle abuts the wireway of the first photovoltaic shingle;
installing the third photovoltaic shingle on the roof deck by overlaying the third photovoltaic shingle on at least the head lap of the first photovoltaic shingle; and
installing the fourth photovoltaic shingle on the roof deck such that a first end of the fourth photovoltaic shingle abuts the wireway of the third photovoltaic shingle and overlays at least the head lap of the second photovoltaic shingle.

In an embodiment, the method of installing the photovoltaic system may include the step of covering each of the wireways and junction boxes with a corresponding lid.

In another embodiment, a method of installing a photovoltaic system includes the following steps:
Obtaining a plurality of photovoltaic shingles, with each photovoltaic shingle of the plurality of the photovoltaic shingles including a first end, a first layer including a head lap portion, a second layer overlaying the first layer, the second layer including at least one solar cell,
Laying a first photovoltaic shingle of the plurality of photovoltaic shingles directly on a deck surface of a steep slope roof
Attaching the first photovoltaic shingle of the plurality of photovoltaic shingles to the deck surface of the steep slope roof.
Laying a second photovoltaic shingle of the plurality of photovoltaic shingles over at least a part of the head lap portion of the first photovoltaic shingle of the plurality of photovoltaic shingles.

Attaching the second photovoltaic shingle to the deck surface of the steep slope roof to form a roof integrated photovoltaic system.

As defined herein, a "steep slope roof" is any roof substrate that is disposed on a roof having a pitch of Y/X, where Y and X are in a ratio of 4:12 to 12:12, where Y corresponds to the "rise" of the roof, and where X corresponds to the "run" of the roof.

In some embodiments, Y and X are in a ratio of 5:12 to 12:12. In some embodiments, Y and X are in a ratio of 6:12 to 12:12. In some embodiments, Y and X are in a ratio of 7:12 to 12:12. In some embodiments, Y and X are in a ratio of 6:12 to 12:12. In some embodiments, Y and X are in a ratio of 8:12 to 12:12. In some embodiments, Y and X are in a ratio of 6:12 to 12:12. In some embodiments, Y and X are in a ratio of 9:12 to 12:12. In some embodiments, Y and X are in a ratio of 10:12 to 12:12. In some embodiments, Y and X are in a ratio of 11:12 to 12:12.

In some embodiments, Y and X are in a ratio of 4:12 to 11:12. In some embodiments, Y and X are in a ratio of 4:12 to 10:12. In some embodiments, Y and X are in a ratio of 4:12 to 9:12. In some embodiments, Y and X are in a ratio of 4:12 to 8:12. In some embodiments, Y and X are in a ratio of 4:12 to 7:12. In some embodiments, Y and X are in a ratio of 4:12 to 6:12. In some embodiments, Y and X are in a ratio of 4:12 to 5:12.

In some embodiments, Y and X are in a ratio of 5:12 to 11:12. In some embodiments, Y and X are in a ratio of 6:12 to 10:12. In some embodiments, Y and X are in a ratio of 7:12 to 9:12.

In some embodiments, Y and X are in a ratio of 2:12. In some embodiments, Y and X are in a ratio of 3:12.

Figure 24:
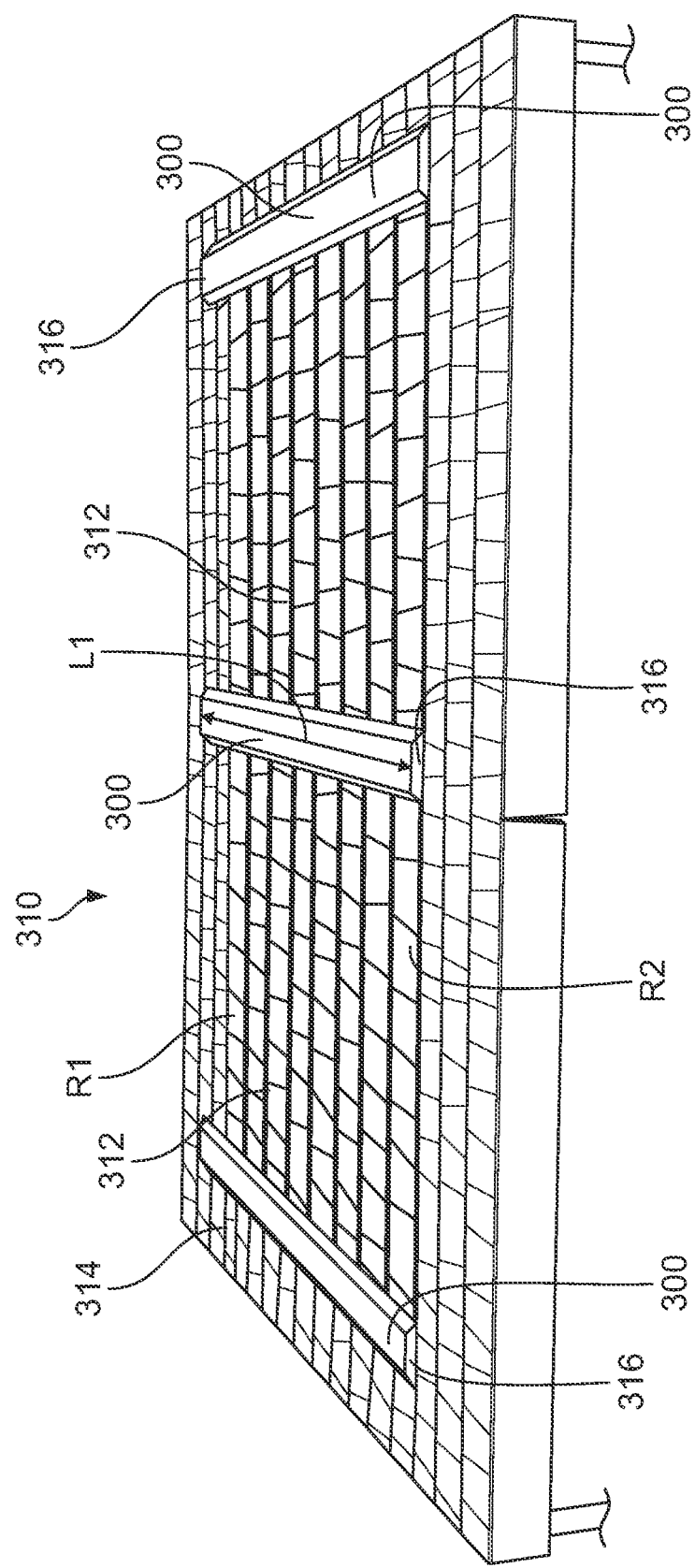
FIG. 24 is a perspective view of a roofing system including an embodiment of a plurality of wireways.

Referring to FIG. 24, in an embodiment, a roofing system 310 includes a plurality of solar shingles 312 arranged in a plurality of rows, a plurality of roofing shingles 314, and a plurality of wireways 300. In an embodiment, the plurality of rows of the solar shingles 312 includes an upper row R1 and a lower row R2. In an embodiment, each of the wireways 300 includes a length L1. In an embodiment, the length L1 extends from the lower row R2 to the upper row R1. In an embodiment, the length L1 extends from the lower row R2 to at least to the upper row R1. In an embodiment, the length L1 extends from the lower row R2 to a location past the upper row R1. In an embodiment, the wireways 300 includes a lid 316. In an embodiment, the lid 316 is a single lid that extends the length L1.

Figure 25:
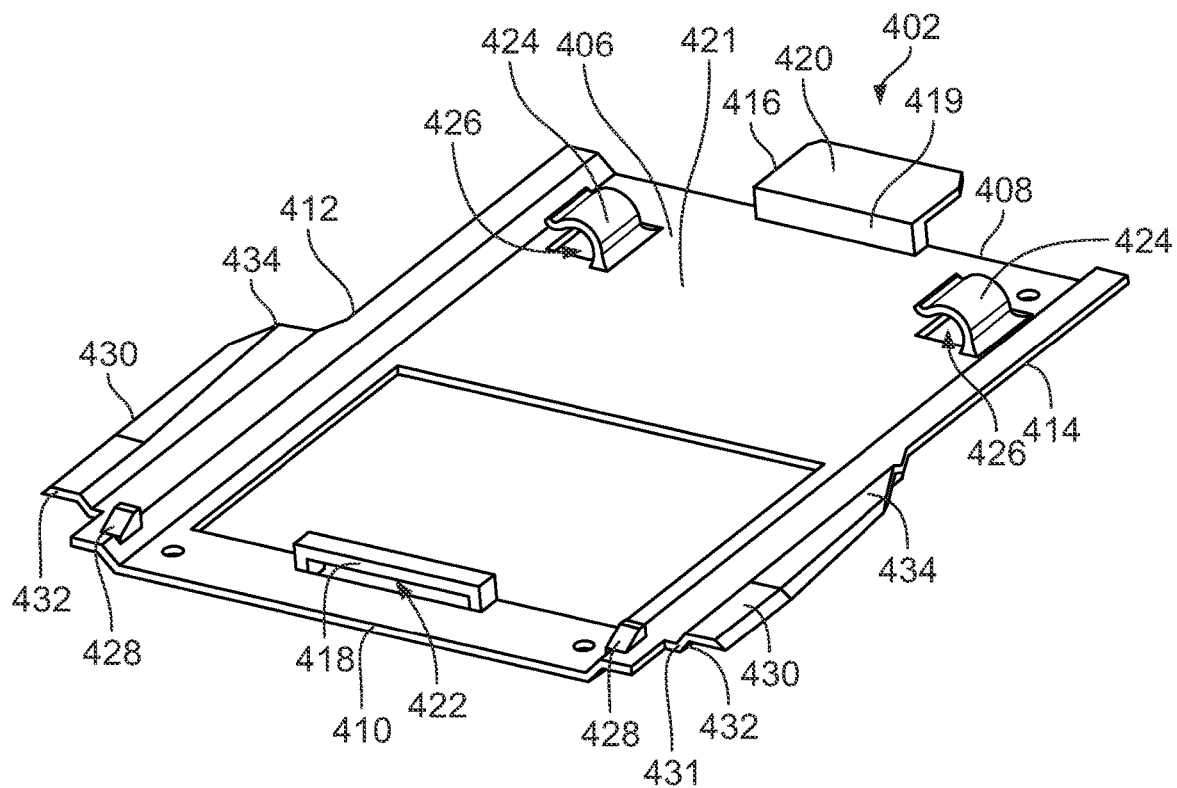
FIGS. 25 through 28 illustrate embodiments of a wireway.
Figure 26:
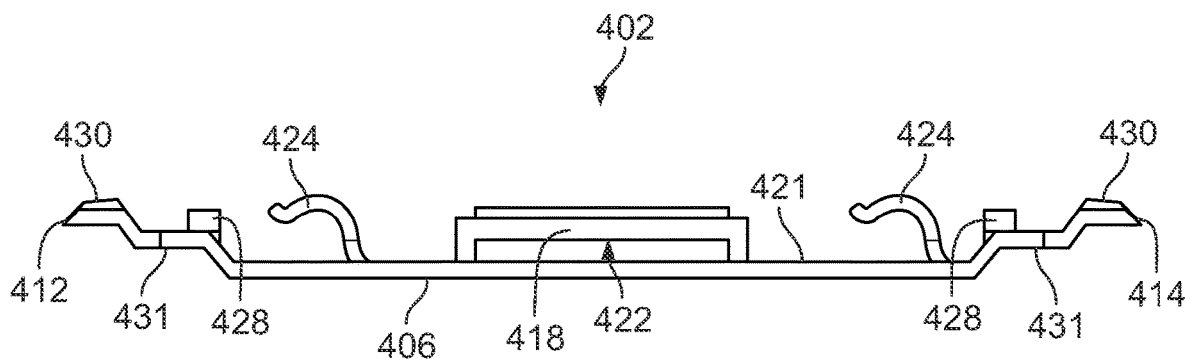
Figure 27:
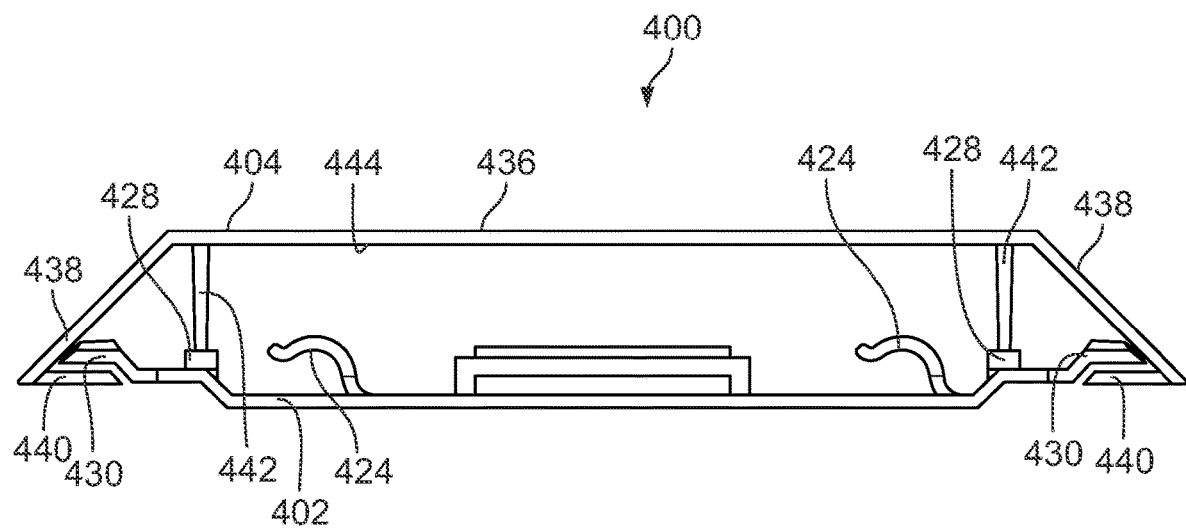

Referring to FIGS. 25 through 27, in an embodiment, a wireway 400 includes a bracket 402 and a lid 404 attached removably to the bracket 402. In an embodiment, the bracket 402 includes a body 406 having a first end 408, a second end 410 opposite the first end 408, and a pair of side edges 412, 414 extending from the first end 408 to the second end 410. In an embodiment, the body 406 is rectangular in shape. In an embodiment, the body 406 includes a first alignment portion 416 located proximate to the first end 408 and a second alignment portion 418 located proximate to the second end 410. In an embodiment, the first alignment portion 416 includes a base 419 and a tab 420 connected to the base 419 and extending outwardly and spaced from a surface 421 of the body 406. In an embodiment, the tab 420 includes an L-shape. In an embodiment, the second alignment portion 418 includes a slot 422. In an embodiment, the slot 422 is rectangular in shape.

In an embodiment, the bracket 402 includes a plurality of clips 424. In an embodiment, the plurality of clips 424 extends outwardly from the surface 421. In an embodiment, each of the plurality of clips 424 is curvilinear in shape and includes a slot 426. In an embodiment, the slot 426 is sized and shaped to receive and hold an electrical wire or cable therein. In an embodiment, one of the plurality of clips 424 is located proximate to the first end 408 and another of the plurality of clips 424 is located proximate to the second end 410. In an embodiment, the bracket 402 includes a plurality of stops 428 located proximate to the second end 410. In an embodiment, one of the plurality of stops 428 is located proximate to the first end 408 and another of the plurality of stops 428 is located proximate to the second end 410. In an embodiment, the bracket 402 includes a plurality of hold down portions 430. In an embodiment, one of the plurality of hold down portions 430 is located proximate to the first end 408 and another of the plurality of hold down portions 430 is located proximate to the second end 410. In an embodiment, each of the hold down portions 430 extends from a first end 432, located proximate to the second end 410, and to a second end 434, located intermediate the first end 408 and the second end 410. In an embodiment, each of the hold down portions 430 includes a stepped surface 431. In an embodiment, each of the stepped surfaces 431 provides clearance for an adjacent photovoltaic shingle.

Referring to FIG. 27, in an embodiment, the lid 404 includes a first portion 436 and side portions 438 extending from the first portion 436. In an embodiment, the side portions 438 are angled (i.e., oblique) relative to the first portion 436. In an embodiment, the side portions 438 are angled to prevent shading over adjacent photovoltaic cells. In an embodiment, each of the side portions 438 includes a tab portion 440 that is sized and shaped to removably engage a corresponding one of the hold down portions 430 of the bracket 402. In an embodiment, the lid 404 includes a plurality of support members 442 extending from an interior surface 444 of the lid 404. In an embodiment, each of the plurality of support members 442 engages a corresponding one of the plurality of stops 428 of the bracket 402. In an embodiment, air is permitted to enter the wireway 400 through the side edges 412, 414 for ventilation, since the hold down portions 430 do not extend the entire length of the wireway 400.

Figure 28:
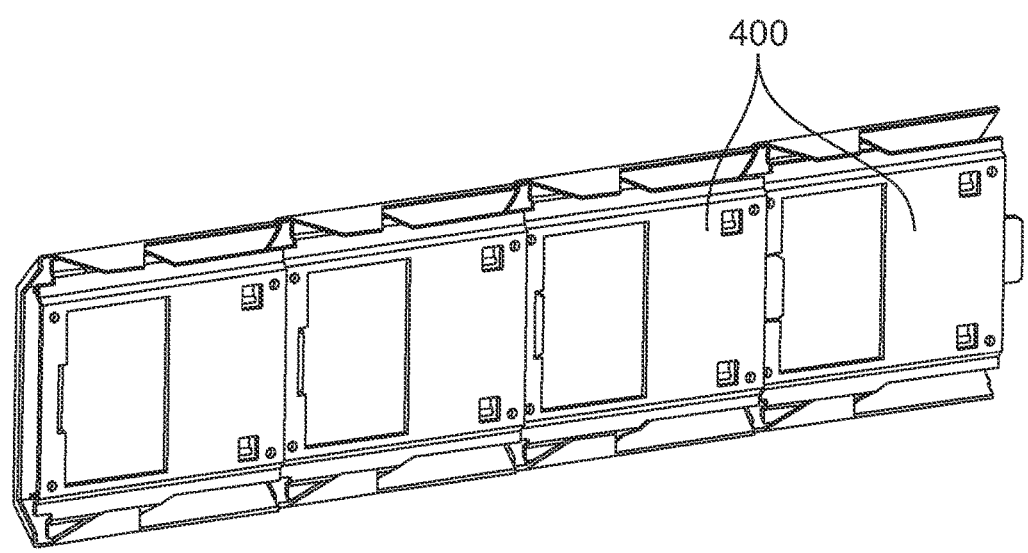

Referring to FIG. 28, in an embodiment, a plurality of the wireways 400 are connected to one another. In an embodiment, the slot 422 of one of the plurality of wireways 400 is sized and shaped to receive the tab 420 of an adjacent one of another of the plurality of wireways 400 to maintain alignment of the plurality of wireways 400 with one another.

Figure 30:
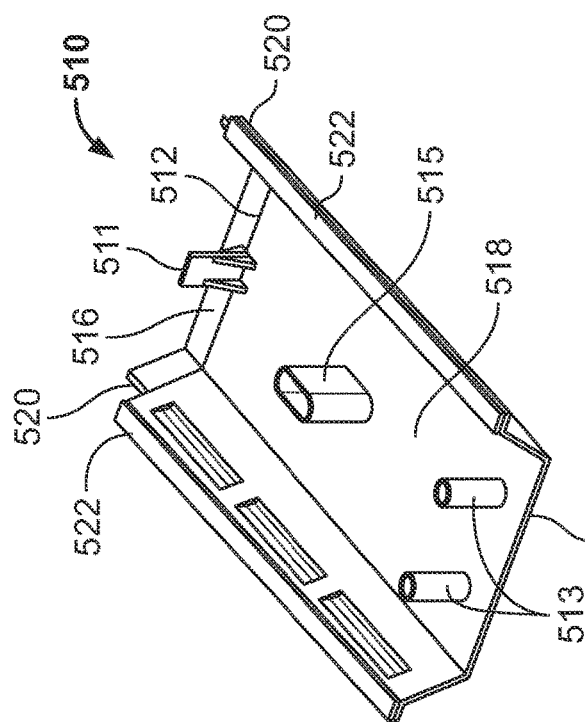
FIGS. 29 through 32 illustrate embodiments of a wireway and an endcap employed thereby.
Figure 32:
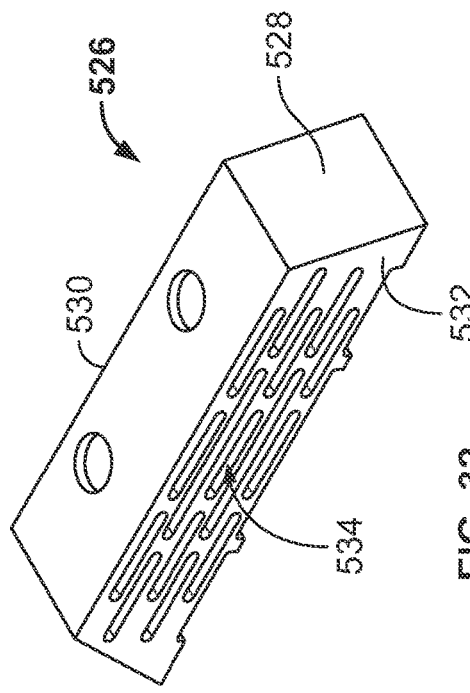
Figure 29:
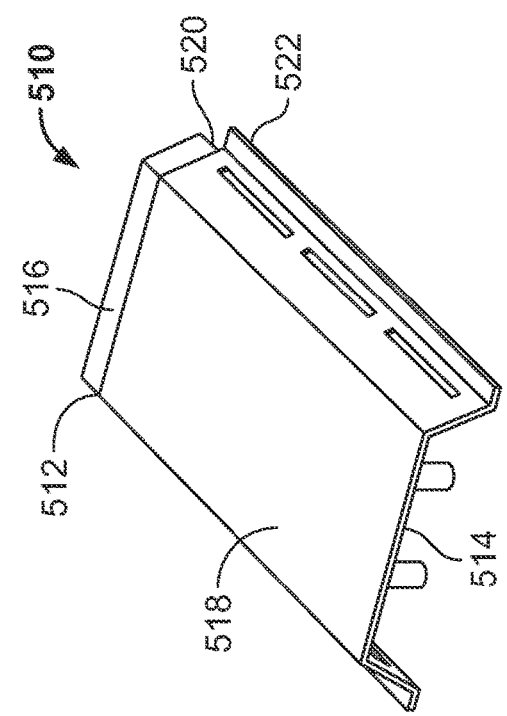
Figure 31:
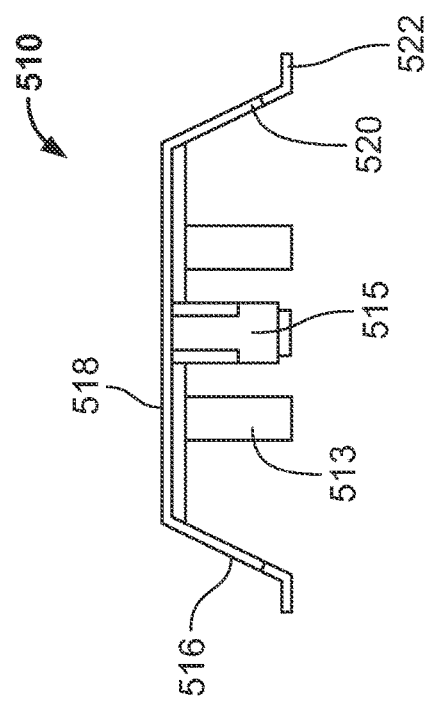

Referring to FIGS. 29 through 31, in an embodiment, a lid 510 for a wireway includes a first end 512 and a second end 514 opposite the first end 512, and an extended portion 516 extending from the first end 512. In an embodiment, the extended portion 516 includes a cross-section similar to the remaining portion 518 of the lid 510, except that ends of side portions 520 of the extended portion 516 are offset from ends of the side portions 522 of the lid 510. In an embodiment, the second end 514 of one of the lids 510 is sized and shaped to overlay the extended portion 516 of another of the lids 510 such that the second end 514 of the one of the lids 510 is aligned with the first end 512 of the other of the lids 510. In an embodiment, the lid 510 includes a first stop 511 extending from an interior surface of the lid 510 and located proximate to the first end 512 for alignment with the second end 514 of an adjacent one of the lids 510. In an embodiment, the lid 510 includes a pair of second stops 513 extending from the interior surface of the lid 510 and located proximate to the second end 514. Referring to FIG. 32, in an embodiment, an end cap 526 includes a body 528 having a first end 530 and a second end 532 opposite the first end 530, and a plurality of vents 534 extending from the first end 530 to the second end 532. In an embodiment, the second end 514 of the lid 510 is sized and shaped to receive the end cap 526. In an embodiment, the second stops 513 prevent the end cap 526 from being pushed too far within the lid 510 and fully past the second end 514. In an embodiment, the plurality of vents 534 permit air flow within the wireway. In an embodiment, the lid 510 includes a centrally located third stop 515 for support and stability of the lid 510 on the wireway.

Figure 33:
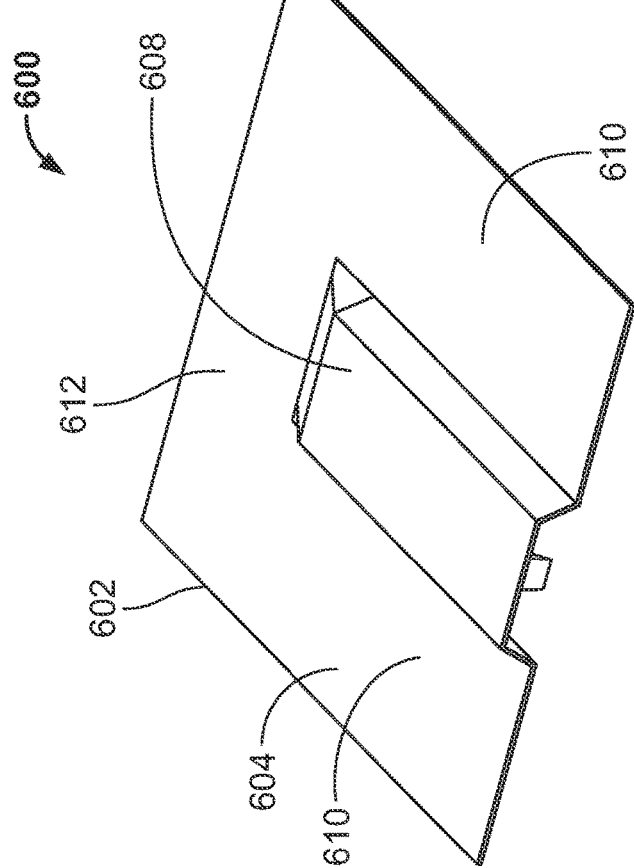
FIGS. 33 and 34 are top perspective and side elevational views, respectively, of an embodiment of a wireway.
Figure 34:
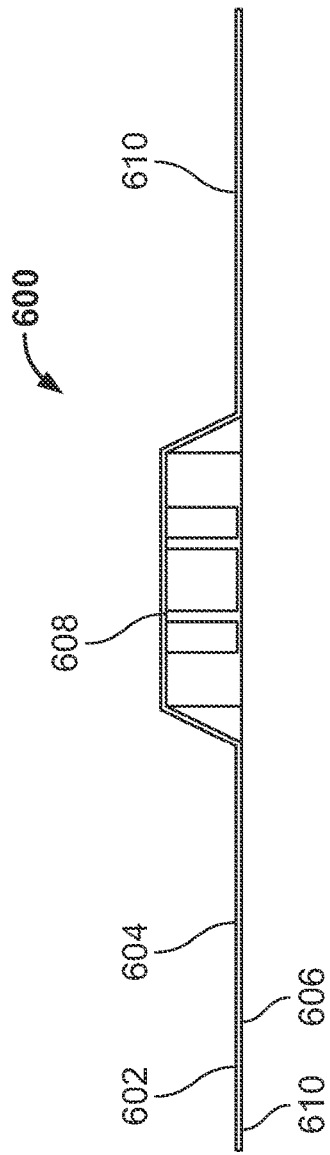

Referring to FIGS. 33 and 34, in an embodiment, a lid 600 for a wireway includes a base 602 having a first surface 604 and a second surface 606 opposite the first surface 604. In an embodiment, the base 602 is square in shape. In another embodiment, the base 602 is rectangular in shape. In an embodiment, the lid 600 includes a cover portion 608 extending outwardly from the first surface 604. In an embodiment, the cover portion 608 is integral with the base 602. In an embodiment, the cover portion 608 is sized and shaped to cover an end of a wireway. In an embodiment, the cover portion 608 is sized and shaped to cover a wireway located at an end of a column of a plurality of wireways. In an embodiment, the lid 600 includes a pair of side flaps 610. In another embodiment, one or more roofing shingles are configured to overlay each of the side flaps 610. In an embodiment, an electrical component is configured to overlay either of the side flaps 610. In an embodiment, the electrical component is a junction box. In another embodiment, the electrical component is at least one electrical connector. In an embodiment, the lid 600 includes a head lap 612. In an embodiment, one or more roofing shingles are configured to overlay the head lap 612. In an embodiment, an electrical component is configured to overlay the head lap 612. In an embodiment, an electrical component is configured to overlay the head lap 612. In an embodiment, the electrical component is an electrical termination box.

Figure 35B:
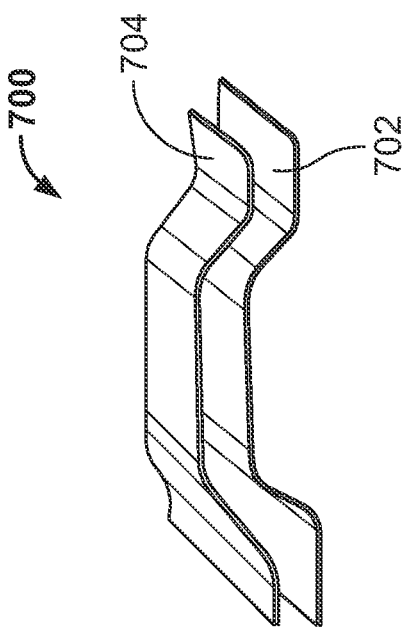
FIGS. 35A and 35B illustrate an embodiment of a lid for a wireway.
Figure 35A:
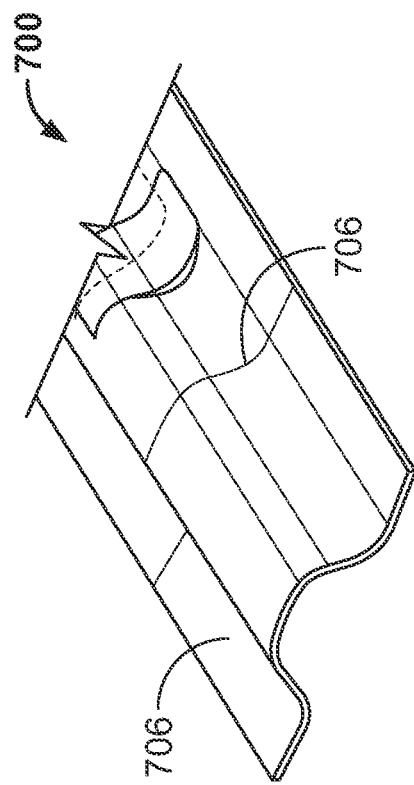

Referring to FIGS. 35A and 35B, in an embodiment, a lid 700 for a wireway includes a first portion 702 and a second portion 704 overlaying the first portion 702. In an embodiment, the lid 700 includes opposed sidewalls 706. In an embodiment, the sidewalls 706 include a curvilinear profile. In another embodiment, the sidewalls 706 include a linear profile. In an embodiment, the first portion 702 is made from an opaque material. In an embodiment, the second portion 704 is made from a transparent material. In another embodiment, the second portion 704 is made from a translucent material. In an embodiment, the section portion 704 includes a coating. In an embodiment, the second portion 704 includes a polymer gel. In an embodiment, the first portion 702 and the second portion 704 are laminated with one another. In an embodiment, the lid 700 is configured to mimic the appearance of a photovoltaic module having a glass layer.

Figure 36B:
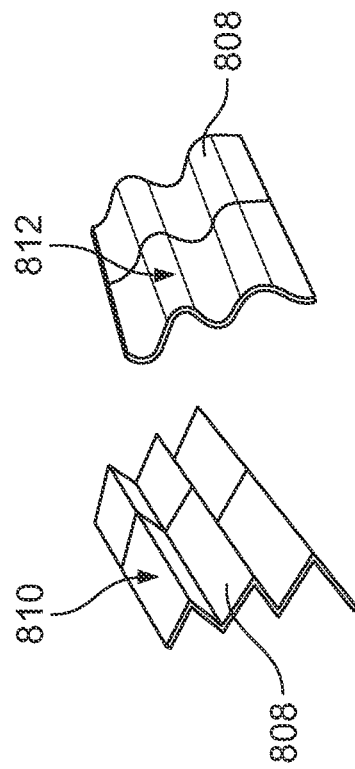
FIGS. 36A and 36B illustrate an embodiment of a lid for a wireway.
Figure 36A:
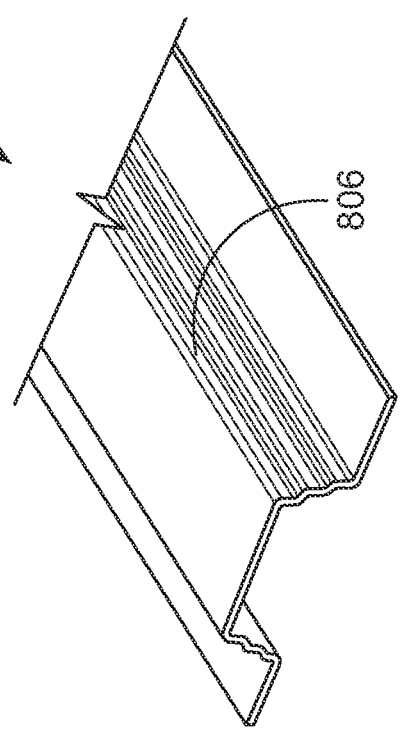

Referring to FIGS. 36A and 36B, in an embodiment, a lid 800 for a wireway includes opposed sidewalls 806. In an embodiment, the each of the sidewalls 806 includes a plurality of surfaces 808. In an embodiment, the plurality of surfaces 808 includes linear surfaces 810. In an embodiment, the linear surfaces 810 form an angled pattern. In another embodiment, the plurality of surfaces 808 includes curvilinear surfaces 812. In an embodiment, the plurality of surfaces 808 form a sinusoidal pattern. In an embodiment, each of the plurality of surfaces 808 is configured to create shadows on the sidewalls 806 to provide a consistent tone of the lid 800 and enable the lid 800 to blend in with other components of a roofing system, such as roofing shingles and photovoltaic shingles.

Referring to FIGS. 37A and 37B, in an embodiment, a lid 900 for a wireway includes opposed sidewalls 906. In an embodiment, each of the sidewalls 906 includes a plurality of fins 908. In an embodiment, the plurality of fins 908 is configured to dissipate heat from and within the wireway. In an embodiment, the plurality of fins 908 includes an angular profile 910. In another embodiment, the plurality of fins 908 includes a curvilinear profile 912. In another embodiment, the plurality of fins 908 includes a rectangular profile 914 (e.g., similar to a heat sink).

Referring to FIGS. 38A and 38B, in an embodiment, a lid 1000 for a wireway includes an upper portion 1002 and pair of sidewalls 1004 extending from the upper portion 1002. In an embodiment, each of the sidewalls 1004 includes a rail 1006 that extends the length of the lid 1000 and forms a slot 1008 between the rail 1006 and the upper portion 1002. In an embodiment, an insert 1010 is sized and shaped to be slidably received within the slots 1008 and over the upper portion 1002. In an embodiment, the insert 1010 is rectangular in shape. In an embodiment, the insert 1010 is flat. In another embodiment, the insert 1010 is U-shaped. In an embodiment, the insert 1010 includes asphalt material. In an embodiment, the insert 1010 includes an appearance that mimics the appearance of an asphalt roofing shingle. In another embodiment, the insert 1010 includes a photovoltaic cell. In an embodiment, the insert 1010 includes an appearance that mimics the appearance of a photovoltaic cell. In an embodiment, the insert 1010 includes a printed graphic.

It should be understood that the embodiments described herein are merely exemplary and that a person skilled in the art may make many variations and modifications without departing from the spirit and scope of the invention. All such variations and modifications are intended to be included within the scope of the invention.

What is claimed is:

1. A method, comprising the steps of:
   obtaining a plurality of photovoltaic shingles,
      wherein each of the photovoltaic shingles includes
         a first end,
         a second end opposite the first end,
         a first edge extending from the first end to the second end, and
         a second edge opposite the first edge and extending from the first end to the second end,
         a head lap portion,
            wherein the head lap portion extends from the first end to the second end and from the first edge to a location between the first edge and the second edge,
         a step flap located at the first end,
            wherein the step flap includes a length extending from the first end to a location between the first end and the second end;
   installing at least three of the photovoltaic shingles on a slope of a roof deck,
      wherein a first photovoltaic shingle of the at least three of the photovoltaic shingles is horizontally adjacent to a second photovoltaic shingle of the at least three of the photovoltaic shingles,
      wherein a third photovoltaic shingle of the at least three of the photovoltaic shingles is vertically adjacent to the first photovoltaic shingle,
      wherein the first ends of the first and third photovoltaic shingles are substantially aligned with each other,
      wherein the second ends of the first and third photovoltaic shingles are substantially aligned with each other, wherein the first photovoltaic shingle overlays at least a part of the head lap portion of the third photovoltaic shingle, wherein the second photovoltaic shingle overlays at least a part of the step flap of the first photovoltaic shingle; and installing at least one wireway proximate to the first end of at least the first end of the first photovoltaic shingle.

2. The method of claim 1, wherein the at least one wireway is installed between the first end of the first photovoltaic shingle and the second end of the second photovoltaic shingle.

3. The method of claim 1, wherein the at least one wireway includes a lid, and wherein the lid is removably attached to the at least one wireway.

4. The method of claim 3, wherein the at least one wireway includes at least one slot and the lid includes at least one rail, and wherein the at least one slot removably receives the at least one rail.

5. The method of claim 1, wherein the at least one wireway includes an inner surface having at least one support member extending outwardly therefrom.

6. The method of claim 1, wherein the at least one wireway overlays a corresponding one of the step flaps.

7. The method of claim 1, wherein the at least one wireway has a height of 1 mm to 20 mm.

8. The method of claim 1, wherein the at least one wireway includes a single wireway installed proximate to the first end of each of the first and third photovoltaic shingles.

9. The method of claim 1, wherein the at least one wireway is moisture resistant.

10. The method of claim 1, further comprising the step of installing an end cap at an end of the at least one wireway, wherein the end cap includes a plurality of vents.

11. A method, comprising the steps of:
obtaining a plurality of photovoltaic shingles,
wherein each of the photovoltaic shingles includes
a first end,
a second end opposite the first end,
a first edge extending from the first end to the second end, and
a second edge opposite the first edge and extending from the first end to the second end,
a step flap located at the first end,
wherein the step flap includes a length extending from the first end to a location between the first end and the second end;
installing at least three of the photovoltaic shingles on a slope of a roof deck,
wherein a first photovoltaic shingle of the at least three of the photovoltaic shingles is horizontally adjacent to a second photovoltaic shingle of the at least three of the photovoltaic shingles,
wherein a third photovoltaic shingle of the at least three of the photovoltaic shingles is vertically adjacent to the first photovoltaic shingle,
wherein the first ends of the first and third photovoltaic shingles are substantially aligned with each other,
wherein the second ends of the first and third photovoltaic shingles are substantially aligned with each other,
wherein the first photovoltaic shingle overlays at least a part of the third photovoltaic shingle,
wherein the second photovoltaic shingle overlays at least a part of the step flap of the first photovoltaic shingle; and installing at least one wireway proximate to the first end of at least the first end of the first photovoltaic shingle.

12. The method of claim 11, wherein the at least one wireway is installed between the first end of the first photovoltaic shingle and the second end of the second photovoltaic shingle.

13. The method of claim 11, wherein the at least one wireway includes a lid, and wherein the lid is removably attached to the at least one wireway.

14. The method of claim 13, wherein the at least one wireway includes at least one slot and the lid includes at least one rail, and wherein the at least one slot removably receives the at least one rail.

15. The method of claim 11, wherein the at least one wireway includes an inner surface having at least one support member extending outwardly therefrom.

16. The method of claim 11, wherein the at least one wireway overlays a corresponding one of the step flaps.

17. The method of claim 11, wherein the at least one wireway has a height of 1 mm to 20 mm.

18. The method of claim 11, wherein the at least one wireway includes a single wireway installed proximate to the first end of each of the first and third photovoltaic shingles.

19. The method of claim 11, wherein the at least one wireway is moisture resistant.

20. The method of claim 11, further comprising the step of installing an end cap at an end of the at least one wireway, wherein the end cap includes a plurality of vents.

21. A method, comprising the steps of:
obtaining a plurality of photovoltaic shingles,
wherein each of the photovoltaic shingles includes
a first end,
a second end opposite the first end,
a first edge extending from the first end to the second end, and
a second edge opposite the first edge and extending from the first end to the second end,
installing at least three of the photovoltaic shingles on a slope of a roof deck,
wherein a first photovoltaic shingle of the at least three of the photovoltaic shingles is horizontally adjacent to a second photovoltaic shingle of the at least three of the photovoltaic shingles,
wherein a third photovoltaic shingle of the at least three of the photovoltaic shingles is vertically adjacent to the first photovoltaic shingle,
wherein the first ends of the first and third photovoltaic shingles are substantially aligned with each other,
wherein the second ends of the first and third photovoltaic shingles are substantially aligned with each other,
wherein the first photovoltaic shingle overlays at least a part of the third photovoltaic shingle,
wherein the second photovoltaic shingle overlays at least a part of the first photovoltaic shingle; and
installing at least one wireway proximate to the first end of at least the first end of the first photovoltaic shingle.

22. The method of claim 21, wherein the at least one wireway is installed between the first end of the first photovoltaic shingle and the second end of the second photovoltaic shingle.

23. The method of claim 21, wherein the at least one wireway includes a lid, and wherein the lid is removably attached to the at least one wireway.

24. The method of claim 23, wherein the at least one wireway includes at least one slot and the lid includes at least one rail, and wherein the at least one slot removably receives the at least one rail.

25. The method of claim 21, wherein the at least one wireway includes an inner surface having at least one support member extending outwardly therefrom.

26. The method of claim 21, wherein the at least one wireway has a height of 1 mm to 20 mm.

27. The method of claim 21, wherein the at least one wireway includes a single wireway installed proximate to the first end of each of the first and third photovoltaic shingles.

28. The method of claim 21, wherein the at least one wireway is moisture resistant.

29. The method of claim 21, further comprising the step of installing an end cap at an end of the at least one wireway, wherein the end cap includes a plurality of vents.

30. A method, comprising the steps of:
obtaining a plurality of photovoltaic shingles,
wherein each of the photovoltaic shingles includes
a first end,
a second end opposite the first end,
a head lap portion,
wherein the head lap portion extends from the first end to the second end,
a step flap located at the first end;
installing at least three of the photovoltaic shingles on a slope of a roof deck,
wherein a first photovoltaic shingle of the at least three of the photovoltaic shingles is horizontally adjacent to a second photovoltaic shingle of the at least three of the photovoltaic shingles,
wherein a third photovoltaic shingle of the at least three of the photovoltaic shingles is vertically adjacent to the first photovoltaic shingle,
wherein the first ends of the first and third photovoltaic shingles are substantially aligned with each other,
wherein the second ends of the first and third photovoltaic shingles are substantially aligned with each other,
wherein the first photovoltaic shingle overlays at least a part of the head lap portion of the third photovoltaic shingle,
wherein the second photovoltaic shingle overlays at least a part of the step flap of the first photovoltaic shingle; and
installing at least one wireway proximate to the first end of at least the first end of the first photovoltaic shingle.

* * * * *